United States Patent [19]
Ferguson

[11] 3,861,491
[45] Jan. 21, 1975

[54] AIR CUSHION VEHICLE

[76] Inventor: Hugo S. Ferguson, c/o Air Cushion Vehicles, Inc., R.D. No. 5, Box 85, Troy, N.Y. 12180

[22] Filed: Nov. 27, 1973

[21] Appl. No.: 419,244

Related U.S. Application Data

[63] Continuation-in-part of Ser. No. 314,995, Dec. 14, 1972, abandoned.

[52] U.S. Cl. .............................. 180/120, 180/126
[51] Int. Cl. ............................................. B60v 1/16
[58] Field of Search ........... 180/116, 117, 120, 121, 180/122, 123, 126

[56] References Cited
UNITED STATES PATENTS

| | | | |
|---|---|---|---|
| 2,364,677 | 12/1944 | Warner............................... | 180/120 |
| 3,259,097 | 7/1966 | Van Veldhuizen et al......... | 180/126 |
| 3,292,721 | 12/1966 | Dobson.............................. | 180/120 |
| 3,486,577 | 12/1969 | Jackes................................ | 180/120 |
| 3,608,662 | 9/1971 | Ferguson ........................... | 180/117 |
| 3,608,663 | 9/1971 | Ferguson ........................... | 180/120 |
| 3,612,208 | 10/1971 | Ferguson ........................... | 180/120 |

*Primary Examiner*—Robert G. Sheridan
*Assistant Examiner*—Ross Weaver
*Attorney, Agent, or Firm*—Willis H. Taylor, Jr.

[57] ABSTRACT

A propeller mounted toward the front of the vehicle provides both propulsion and air cushion. A body section has lateral openings on each side of the vehicle behind the propeller. Front steering and thrust spoiling are obtained by sets of vanes rotatably mounted in these openings and spaced progressively rearwardly and inwardly in diagonal disposition. In turning, predetermined vanes of one set are turned outward and those of the other set inward. For thrust spoiling, both sets are preferably turned inward. Air flow to rear steering vanes on the outside of a turn is maintained for at least smaller turning angles by initially turning the forward vanes of a diagonal set faster than the rearward vanes of the set, or by using fixed air channels, or both. It is presently preferred to use fixed air channels controlled by respective rearward vanes of the diagonal sets to maintain air flow to the rear steering vanes on the outside of a turn for a major portion or all of the steering range, while reducing air flow to the rear steering vanes on the inside of the turn for at least larger turning ranges within the steering range. Transversely-disposed sets of vanes mounted between the diagonally-disposed sets are controlled to direct air toward the outside of a turn progressively as the turning angle increases. Differential control of air flow to the rear steering vanes is also described.

27 Claims, 38 Drawing Figures

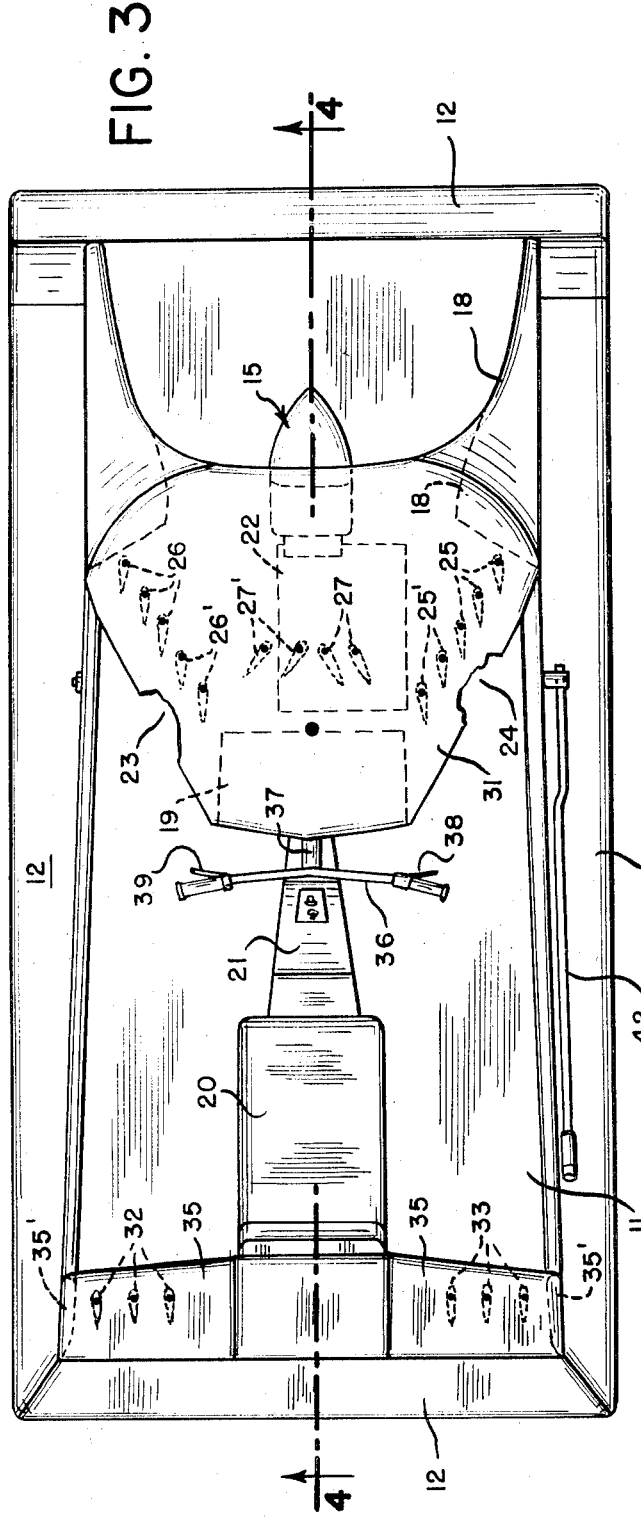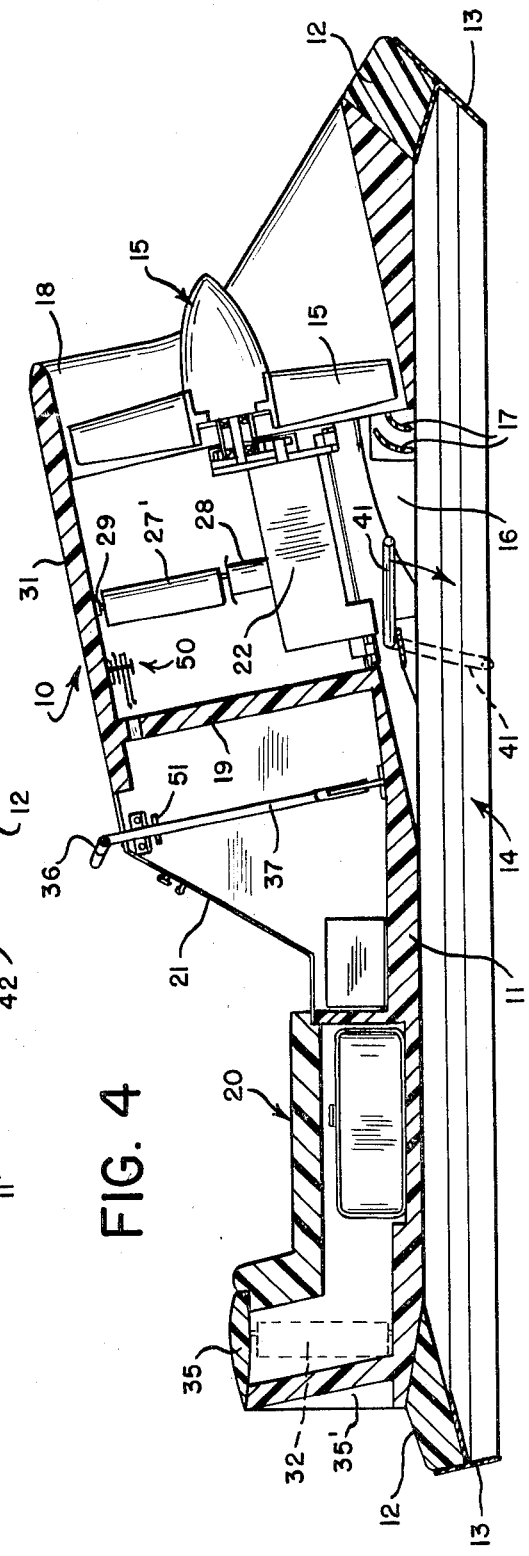

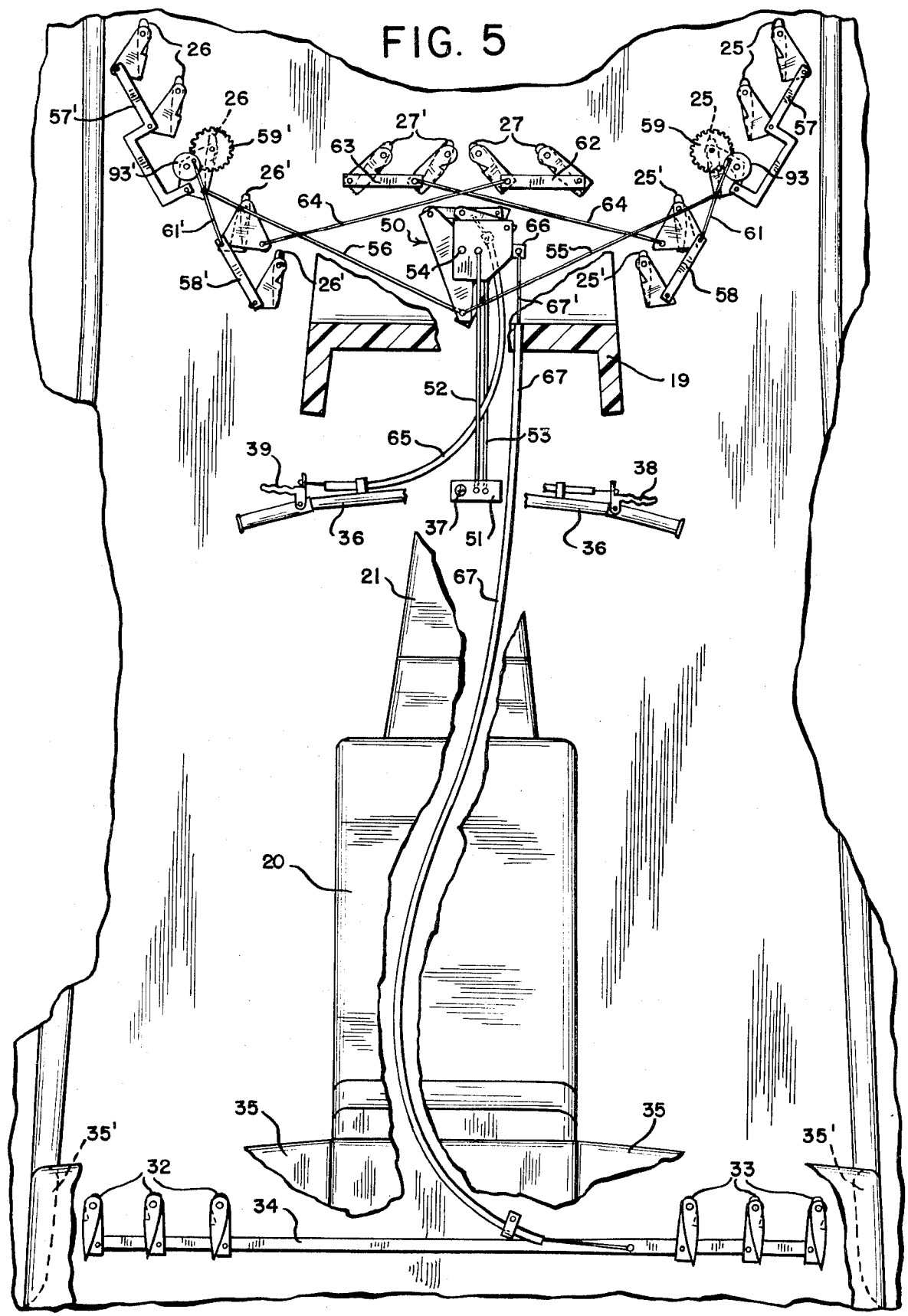

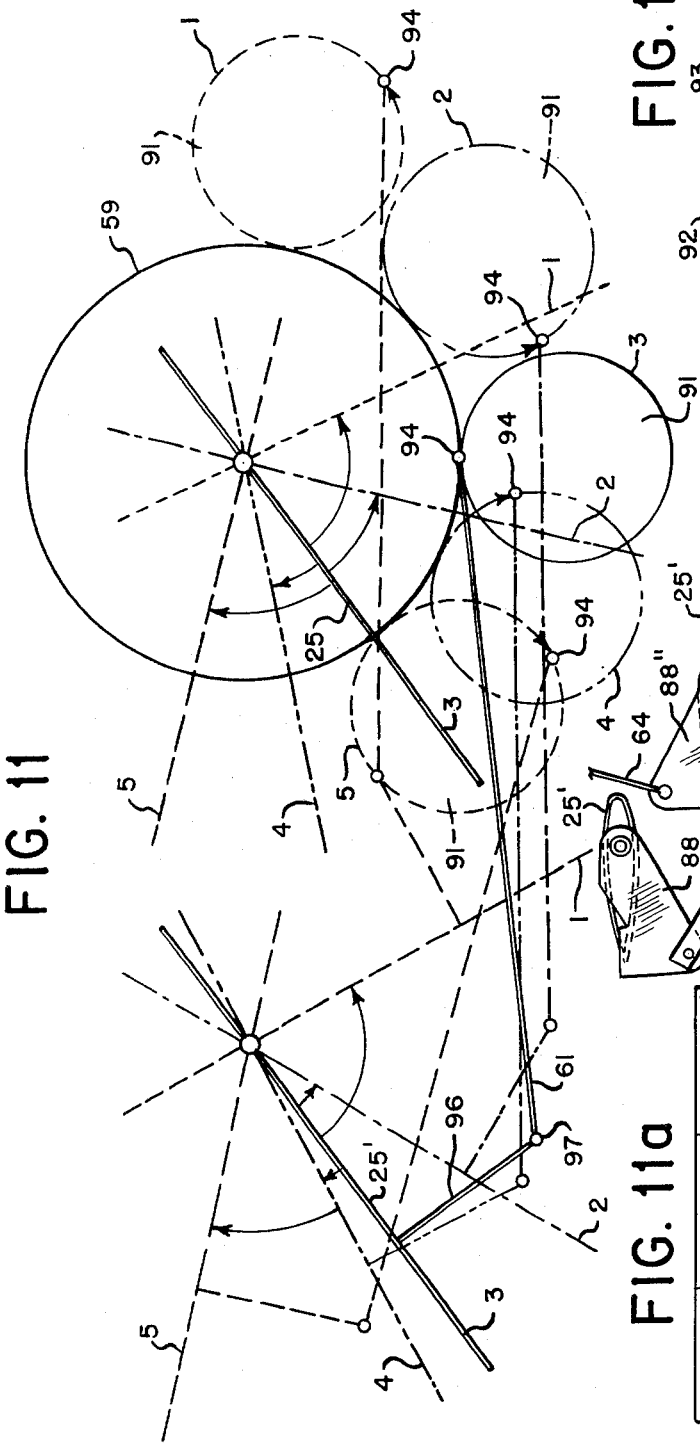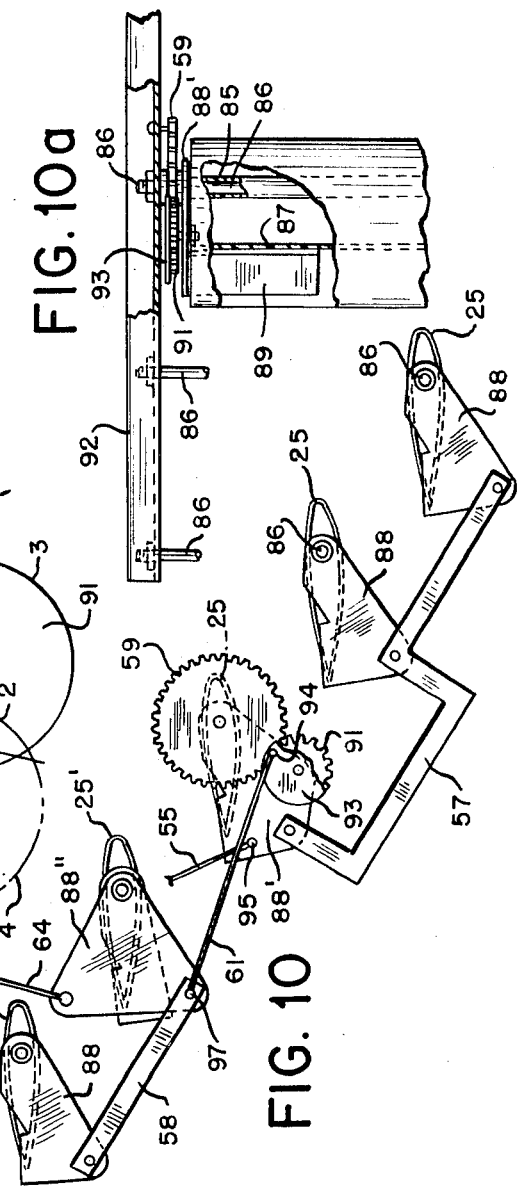

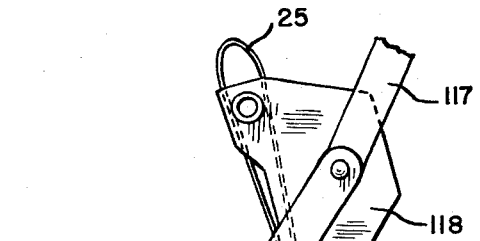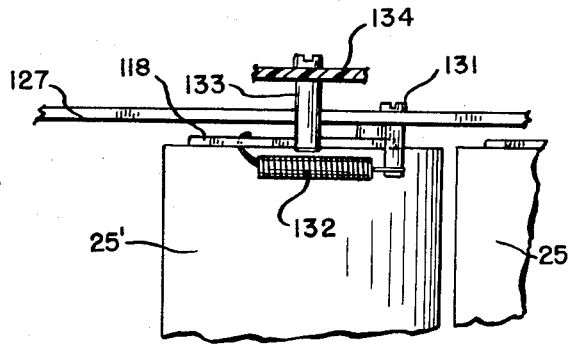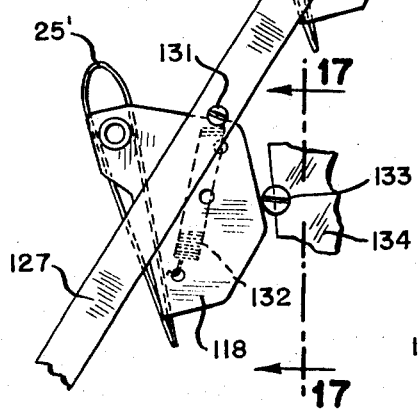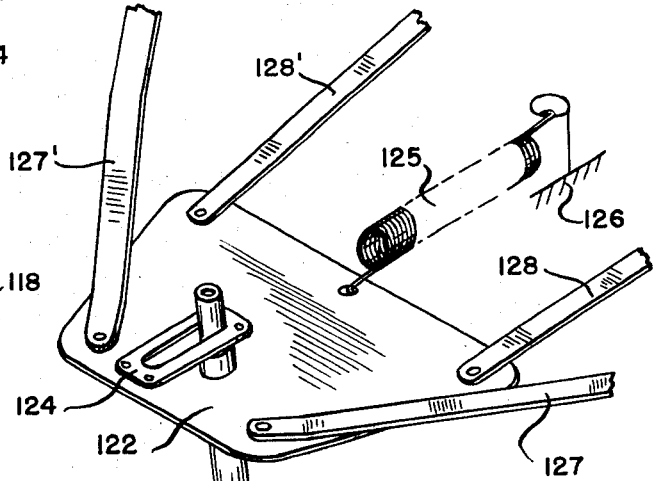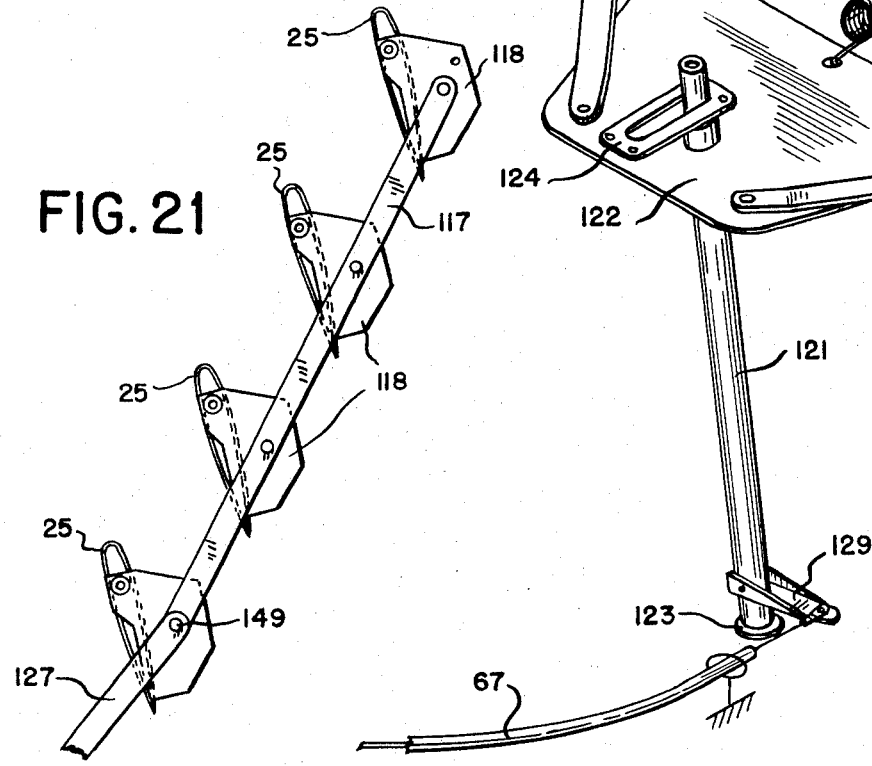

AIR CUSHION VEHICLE

RELATED APPLICATION

This application is a continuation-in-part of application Ser. No. 314,995 filed Dec. 14, 1972 now abandoned.

BACKGROUND OF THE INVENTION

In U.S. Pat. No. 3,608,662 issued Sept. 28, 1971 to the present inventor, an air cushion vehicle is described which provides two-point steering with air propelling means mounted toward the front of the vehicle. A single propeller is particularly described, and provides air for the air cushion as well as for propulsion and steering. A set of front steering vanes is mounted behind the propeller and directs air laterally to the ambient air on either side of the vehicle for front steering. Air channels on respective sides of the vehicle direct a portion of the downstream flow of air, under the control of the front steering vanes, to rear steering vanes on each side of the vehicle. Over a substantial portion of the front steering range air flow to the rear vanes on the outside of a turn is maintained while air flow on the inside of a turn is reduced, thereby assuring effective control on turns without undue skidding.

In U.S. Pat. No. 3,608,663, issued Sept. 28, 1971 to the present inventor, thrust control is provided by air-blocking means in the path of the downstream flow of air through the air channels, and horizontally pivoted vanes in the air channels are specifically described.

Vehicles as described in the foregoing patents have been found satisfactory in operation and provide effective control. However, with the three-blade propeller specifically shown, a fairly high speed of rotation is employed to secure the desired plenum pressure and speed of air flow for propulsion, for example about 5,100 r.p.m. This results in considerable propeller noise, and also some noise from the front steering vanes near the propeller axis where the propeller blades pass the vanes in approximately parallel relationship.

To reduce propeller noise and obtain a higher and more even air pressure to the plenum chamber, as well as greater air velocities for propulsion, the number of blades on the propeller was increased and their cross-section enlarged so that the desired results could be obtained at much lower rotational speeds, for example, about 2,900 r.p.m.

While effective in reducing propeller noise, since the tip velocity was considerably reduced, it was found that the increased pressure between the propeller and steering vanes caused the vanes to vibrate and sometimes tear away. Although stronger vanes might be employed, it was also found that the noise due to air flow disturbances as the propeller blades passed the steering vanes in approximately parallel relationship became much greater, thus partially counteracting the reduction in propeller noise.

The present invention is directed to a new arrangement of front steering vanes which markedly reduces noise attributable to the vanes, while maintaining effective steering. Also the new arrangement provides for both steering and thrust spoiling using the same sets of vanes.

SUMMARY OF THE INVENTION

In accordance with the invention, the front steering means includes respective forward sets of vanes rotatably mounted on opposite sides of the vehicle and spaced progressively rearwardly and inwardly of the vehicle in the airflow from the propelling means. Thus each set of vanes is diagonally disposed with respect to the center line of the vehicle. Means are provided for orienting the vanes approximately fore and aft for forward propulsion, with at least a portion of the air therefrom directed to the rear steering means on each side of the vehicle. In the specific embodiments the rear steering means are sets of vanes laterally spaced on each side of the vehicle.

Front steering is preferably accomplished by turning predetermined vanes of either of the forward set of vanes outward to direct a portion of the air from the propelling means to the ambient air at lateral angles on either side of the vehicle. Advantageously, predetermined vanes of the other set are turned inward to reduce the rearward flow of air thereby. It is possible to turn predetermined vanes of one set relative to the other set to change the proportion of rearward flow of air thereby, as by turning one set inward while maintaining the other set in fore and aft orientation. However, for overall satisfactory steering, and particularly for rapid turning, it is preferred to turn one set outward aand the other set inward.

It is presently preferred to maintain air flow to the rear steering vanes on the outside of a turn for at least a major portion of the steering range, and to reduce air flow to the rear steering vanes on the inside of a turn for at least larger turning angles within the steering range. In presently preferred embodiments, air flow to the rear steering vanes on the outside of a turn is maintained throughout the steering range, while air flow to the rear steering vanes on the inside of a turn is progressively reduced.

It is possible to substantially eliminate air flow to the rear steering vanes on both sides of the vehicle at large turning angles, so that substantially all the turning is effected by the front steering vanes, and this may be advantageous in starting out from a corner position or near an obstacle. However, at considerable speed it has been found that maintaining rear steering on the outside of a turn gives better control. In either case, it is desirable to maintain air flow to the rear steering vanes on the outside of a turn for at least smaller turning angles within the steering range, advantageously accompanied by a reduction in air flow to the rear steering vanes on the inside of the turn.

Directing air flow to the rear steering vanes may be accomplished by differential control of the diagonally-disposed forward set of vanes, or with the aid of fixed air channels on respective sides of the vehicle, or by both differential control and air channels.

For differential vane control, the forward vanes of the set on the outside of a turn are turned outward at greater angles than at least one rearward vane of the set in the initial portion of the steering range. For faster turns, the rearward vane or vanes may also be turned outward, or their orientation may be left unchanged so as to preserve rear steering.

With air channels, all vanes of a set may be turned together. Although various specific arrangements of the air channels are possible, it is presently preferred to design them and control air flow therethrough to obtain a differential control of the air flow to the rear steering vanes on the outside of a turn which reduces rear steering sensitivity for small turning angles. It is also possible to maintain the orientation of one or more rearward vanes of the diagonally-disposed set on the outside of a turn to provide air flow through the corresponding channel to the rear steering vanes for a major portion or all of the steering range. In either case, the diagonally-disposed vanes on the inside of a turn are preferably turned inward to reduce air flow to the rear steering vanes on that side of the vehicle.

Ordinarily the vehicle will have a body section or superstructure behind the air propelling means to accommodate the operator, and this body section is spaced from the air propelling means to provide lateral openings in which the diagonally-disposed sets of vanes are mounted. To divert air around this body section, it is preferred to mount a set of vanes in front of the body section between the diagonally-disposed vanes, and spaced transversely of the vehicle. These center transversely-spaced vanes are advantageously controlled to progressively transfer air flow thereby toward the diagonally-disposed set of vanes on the outside of a turn.

For thrust spoiling, both diagonally-disposed sets of vanes may be turned to orientations which substantially reduce or prevent flow of air thereby in the rearward direction of the vehicle, thereby substantially reducing or eliminating forward thrust on the vehicle except for such thrust as may be produced by air escaping from the plenum chamber beneath the vehicle. Preferably both sets of diagonally-disposed vanes are turned inward for thrust spoiling. If the center set of vanes is employed, they may be left in their orientation for forward travel or, as is presently preferred, they may be turned inward.

Steering means are provided for controlling the various sets of vanes, and a thrust spoiling control is also provided. These are arranged so that the full thrust-spoiled condition can be relaxed by the operator to allow steering if required.

BRIEF DESCRIPTION OF THE DRAWINGS

FIG. 3 is a plan view of the vehicle of FIGS. 1 and 2;

FIG. 4 is a longitudinal cross-section taken along the line 4—4 of FIG. 3;

FIG. 5 is a plan view of a portion of FIG. 3 with top sections removed to illustrate the vane control system;

FIG. 10 is an enlarged plan view of the control mechanism of one set of diagonally-disposed vanes, and FIG. 10a is an elevation detail of a portion of FIG. 10;

FIG. 11 is a schematic illustrating the relative movements of the forward and rearward groups of vanes in FIG. 10, and FIG. 11a is a table of angles corresponding to FIG. 11;

FIG. 16 is a detail of a portion of a set of diagonally-disposed vanes in FIG. 15, and FIG. 17 is an elevation taken along line 17—17;

FIG. 18 is a detail in perspective of a portion of the vane control mechanism of FIG. 15;

FIG. 21 shows a modification of the steering control structure of FIG. 15 to produce the control of FIGS. 20d–20d.

DESCRIPTION OF THE SPECIFIC EMBODIMENTS

Figure 1:
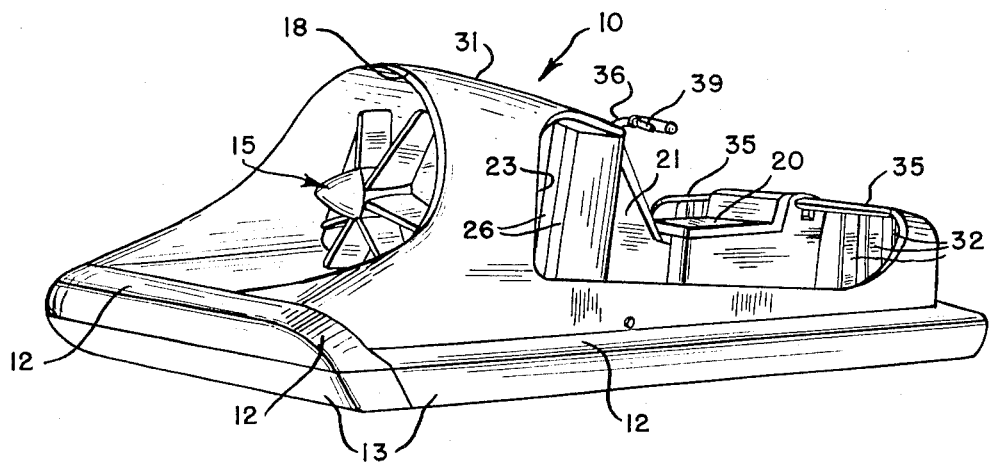
FIGS. 1 and 2 are perspective views of one embodiment of an air cushion vehicle in accordance with the invention, from side front and side rear, respectively.
Figure 2:
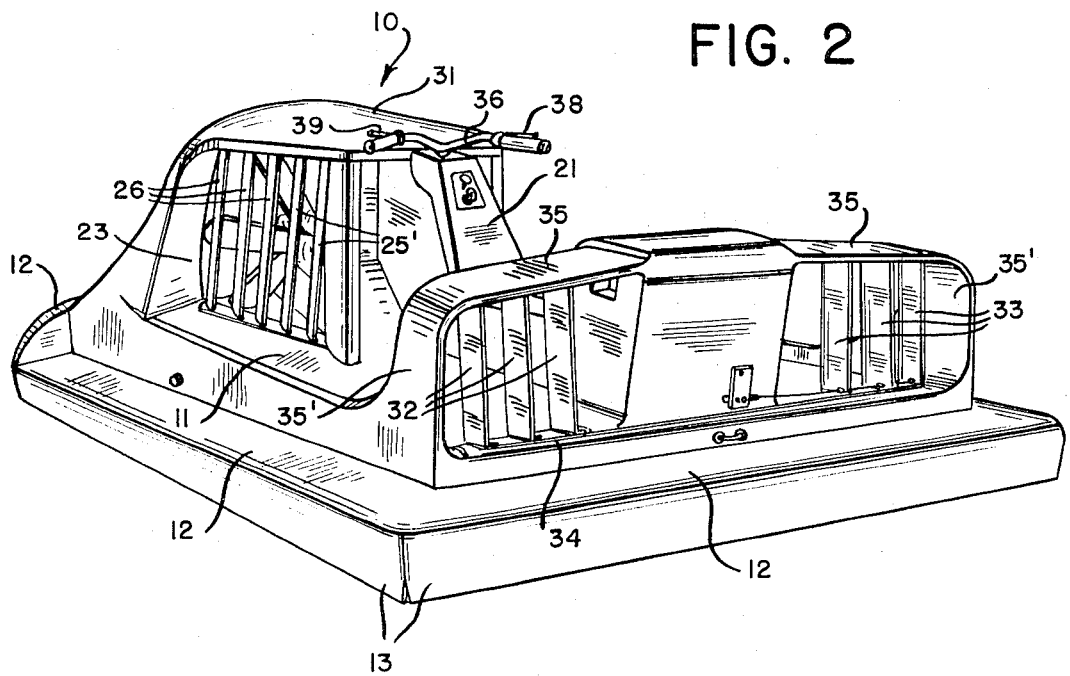

Referring to FIGS. 1–4, the vehicle has a body generally designated 10 including a rigid platform 11, a shock absorber section 12 attached around the periphery of the rigid platform, and a thin skirt 13 of tough flexible material united with the shock absorber section and extending downwardly from the peripheral region thereof. The underside of the vehicle and the skirt 13 form a plenum chamber 14 to which air is introduced under pressure from the lower portion of propeller 15 through a slot-like opening 16 in the platform. Fixed curved vanes 17 direct a portion of the air to the forward part of the plenum chamber so as to equalize air pressure in various parts of the chamber. The construction is similar to that described in application Ser. No. 158,284 filed June 30, 1971 by the present inventor.

Propeller 15 is encircled by a shroud 18 to improve its efficiency, and the upper portion of the shroud is extended back over the body partition 19 behind which the operator sits. A seat 20 is provided for the operator, and includes a gas tank and a compartment for auxiliaries which are described in the aforesaid patents and application and need not be further described here. A trunk section 21 is straddled by the operator and houses portions of the steering gear, starter and ignition switches, etc. An engine 22 drives the propeller through a gear box to obtain the desired speed of rotation.

In this embodiment a seven-blade propeller is employed, with blades of large cross-section, so as to obtain efficient operation at a fairly low speed of rotation. For example, about 2,900 r.p.m. with a 30-inch diameter propeller has been used with success. The lower portion of the propeller supplies a more uniform air flow to the plenum chamber 14 and under a higher pressure than the three-bladed propeller shown in the above patents, thereby improving vehicle performance on uneven terrain.

The sides of shroud 18 terminate slightly behind propeller 15, and body partition 19 is spaced rearward of the propeller so that lateral openings 23, 24 (FIG. 3) open to the ambient air on each side of the vehicle. Advantageously the area of each opening is larger than the propeller area to promote effective propulsion and steering. Sets of vanes 25, 25' and 26, 26' are mounted in these openings and are spaced progressively rearwardly and inwardly of the vehicle, thus being diagonally-disposed with respect to the center line of the vehicle. The vanes are upwardly-extending and advantageously have an air foil cross-section to promote a smooth flow of air thereacross in normal operation. They are rotatably mounted about axes toward the forward ends thereof. The vane axles may be mounted in metal strips at the top and bottom which are secured to the body structure. It will be noted that the propeller and vanes are at a small angle to the vertical, about 11° in this embodiment, similar to that described in the aforesaid U.S. Pat. No. 3,608,662. The dotted outlines in FIG. 3 indicate the tops of the vanes. They are not shown in FIG. 4 to avoid undue complexity.

A transverse set of upwardly-extending vanes 27, 27' are mounted in front of body section 19 between the diagonally-disposed sets of vanes and are spaced transversely of the vehicle. The lower ends of the vane axles are mounted in a fixture 28 attached to the top of engine 22, and the upper ends are mounted in a metal strip 29 attached to the top 31 of the vehicle.

Sets of upwardly-extending rear steering vanes 32, 33 are mounted near the rear of the vehicle on each side thereof. The rear ends of the vanes are connected to a transverse link member 34 (FIGS. 2 and 5) for simultaneous actuation. These vanes are mounted in openings of the rear superstructure having tops 35 and sides 35' which are of air foil configuration to promote stability.

A handlebar 36 is mounted on a steering column 37 in front of the operator position. A throttle lever 38 is mounted on one handle and a thrust control lever 39 on the other handle. A parking stand in the form of a transverse U-shaped bar 41 is pivotally mounted on the vehicle body and a handle 42 attached thereto so that the vehicle can be lifted at approximately its center of gravity and remove most of the weight from the skirt 13 when standing for considerable periods of time.

Referring to FIG. 5, a general view of the vane control is shown. For simplicity of illustration, only the tops of the vanes are shown. A transverse plate 51 fixedly attached to steering column 37 has a front steering rod 52 and a rear steering rod 53 pivotally attached thereto. These rods extend through an aperture at the top of partition 19 to a control mechanism generally designated 50 which is described in detail later. The front and rear steering portions of 50 are independently pivoted for rotation about a fixed axle 54 attached to the underside of top 31 (FIG. 4). The front steering rod 52 rotates the upper portion of mechanism 50 to pull or push the forward vane control rods 55 and 56.

In this embodiment the diagonally-disposed sets of vanes are divided into forward and rearward groups, and each vane is provided with a turning plate. Thus, on the right side the turning plates of the forward group of vanes 25 are connected by connecting link 57 and the rearward group 25' by connecting link 58. Means are provided for producing relative movement between the two groups of vanes, as will be described in connection with FIG. 10. Control rod 55 is connected to turn the forward group 25 and, through control rod 61, the rearward group 25'. The pairs of laterally-disposed vanes 27 and 27' have separate connecting links 62, 63. Control rod 64 connects rearward vanes 25' with vanes 27'. Similar relationships exist for the left set of vanes 26, 26' and transverse vanes 27, and the connecting links and control rods are given corresponding primed numbers.

Thrust spoiling is accomplished by handlebar lever 39 acting through a flexible sheathed cable 65 to actuate control mechanism 50 as will be described. For rear steering the rod 53 pivots plate 66 about axis 54 and, through sheathed cable 67, actuates the connecting link 34 which turns the rear steering vanes.

Figure 6:
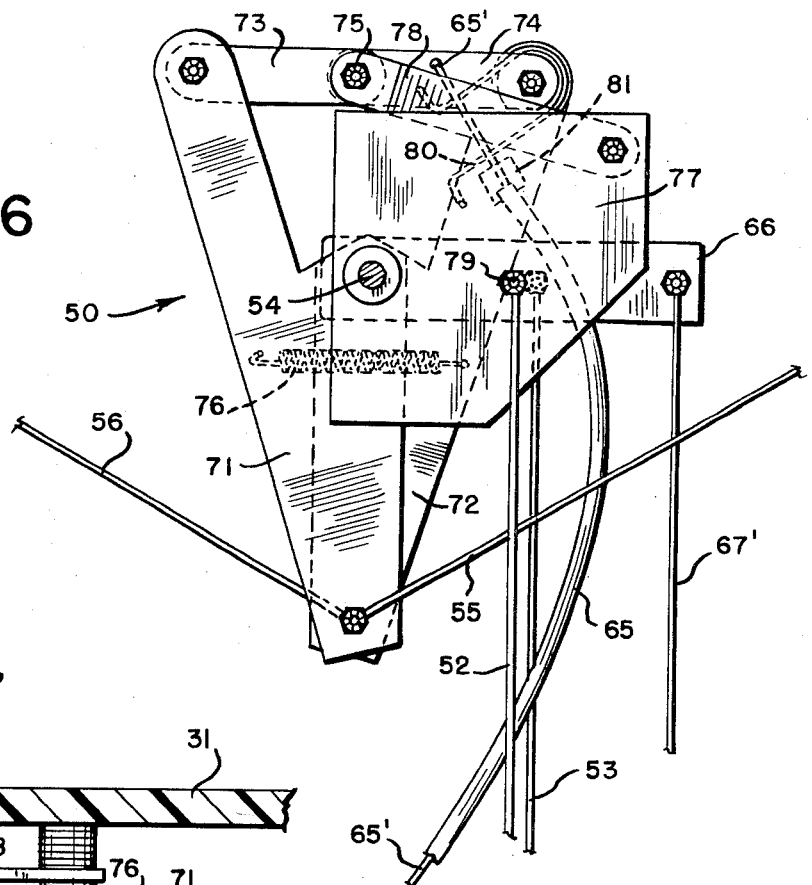
FIG. 6 is an enlarged plan view of a portion of the vane control mechanism in steering condition.
Figure 7:
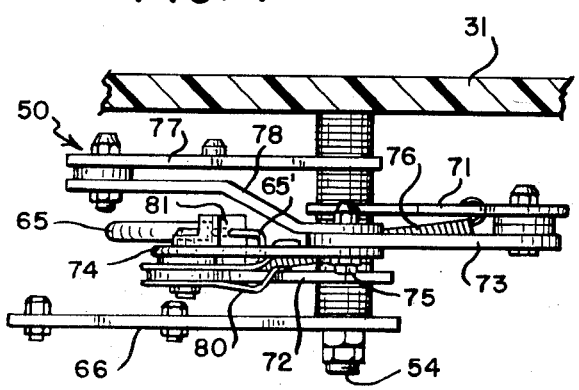
FIG. 7 is a front end view of the mechanism of FIG. 6.

Referring to FIGS. 6 and 7, the steering mechanism 50 is shown in more detail. A pair of levers 71, 72 are mounted for rotation about axle 54, and control rods 55, 56 are pivotally attached to respective rearward ends thereof. A pair of cross links 73, 74 are pivoted together at 75 and respective links are pivoted to the forward ends of the levers. Tension spring 76 tends to hold the levers in the positions shown, with links 73, 74 aligned. A coil spring 80 also biases links 73, 74 toward their aligned positions. Actuating plate 77 is mounted for rotation about axle 54 and a link 78 connects the plate with pivot 75 of the cross linkage.

Figure 8:
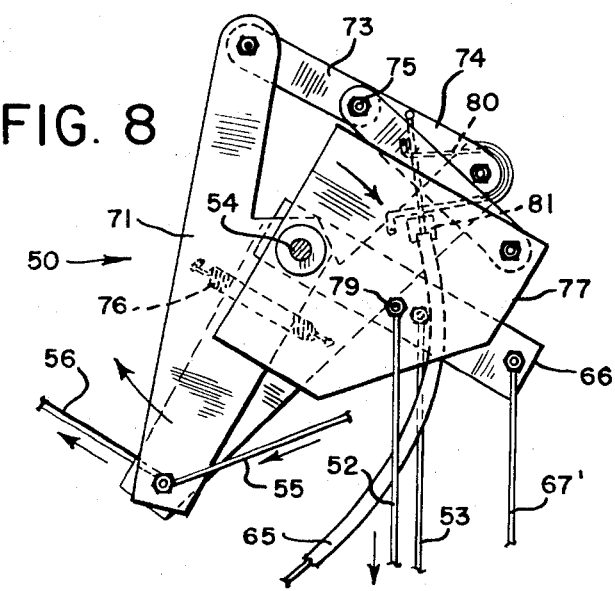
FIG. 8 shows the mechanism of FIG. 6 in position for a righ turn.

Front steering rod 52 is pivoted to plate 77 at 79. When rod 52 is pulled or pushed by turning the handlebar (FIG. 5), it rotates plate 77 and consequently levers 71, 72 about axle 54, thereby pulling or pushing on vane control rods 55, 56 as the case may be. For a right turn, rod 52 is pulled backward, thereby turning the control plate and levers toward the position shown in FIG. 8. Rod 56 pushes the diagonally-disposed vanes 26, 26' outward on the left side, as will be understood from FIG. 5. Rod 55 pulls the corresponding vaanes 25, 25' inward on the right side. Rear steering rod 53 is also pulled backward, thereby pushing on the center rod 67' of the sheathed cable 67 and turning rear steering vanes 32, 33 counterclockwise as seen in FIG. 5. Suitable stops may be provided to limit the travel of the links connecting the vanes of respective sets, thereby setting the extreme positions of the vane turning angles.

Figure 9:
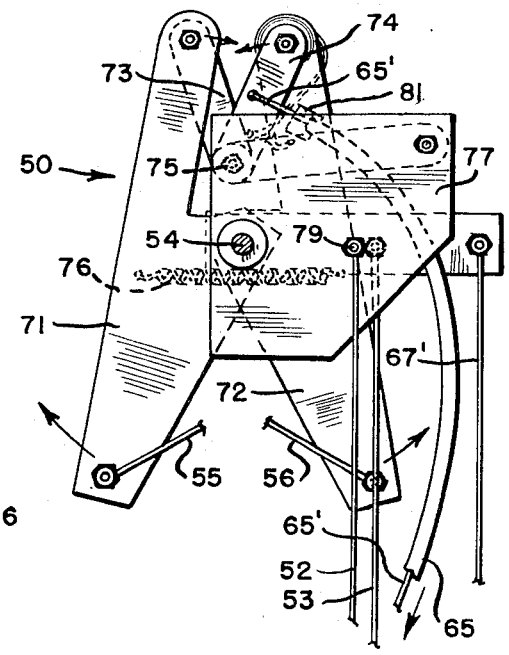
FIG. 9 shows the mechanism of FIG. 6 in thrust spoiling condition.

For thrust spoiling, the sheath of cable 65 is restrained by a fitting 81 mounted on lever 72 and the center rod 65' of the cable is attached to cross link 74. When handlebar lever 39 (FIG. 5) is actuated, it pulls on rod 65' and thereby folds the cross-linkage 73, 74 as shown in FIG. 9 for the straight ahead orientation of the steering system. Consequently the rear ends of levers 71, 72 are forced apart, thereby pulling on both vane control rods 55, 56 and turning both sets of diagonally-disposed vanes inward to cut off rearward thrust.

If, in the thrust spoiled condition of FIG. 9, the operator desires to turn the vehicle, he may turn the handlebar and relax his grip on hand lever 39 sufficiently to allow steering. For example, assume that a right turn is to be made with the control mechanism initially oriented as in FIG. 9. Lever 71 is already in position to close the diagonally-disposed vanes on the right side of the vehicle, which will be on the inside of the turn, and rod 55 will be in tension. As rod 52 is pulled by the handlebar to rotate plate 77 clockwise, the resistance of lever 71 to further movement clockwise will exert a force on the links 73, 74 tending to unfold them. The resultant pull on cable 65' by link 74 will be sensed by the operator so that he will relax his grip on hand lever 39 sufficiently to allow the links 73, 74 to partially or completely unfold, depending on how much the handlebar is turned. Thus lever arm 72 will rotate clockwise to push on vane control rod 56 and turn the left set of diagonally-disposed vanes outward (on the outside of the turn) to produce the right turn. For a left turn, lever 72 will remain in the position shown and lever 71 will rotate counterclockwise, thereby opening the diagonally-disposed vanes on the right side while maintaining the vanes on the left side closed.

It will be recognized that in making either small or large turns from the forward thrust-spoiled condition shown in FIG. 9, the operator can maintain sufficient pressure on hand lever 39 to maintain the forward set of vanes completely closed on the inside of the turn, thereby keeping the forward thrust lever than in the normal steering condition of FIG. 6 for small turning angles. For large turning angles the conditions will be approximately the same, and most of the thrust tends to turn the vehicle about its center.

Referring to FIGS. 10 and 10a mechanism is shown for producing relative movement between selected front and rear vanes of a diagonally-disposed set of vanes. The vanes are molded with an air foil cross-section and a hollow interior except for a tubular section 85 in which a steel rod 86 is inserted to provide an axle on which the vane rotates, and a lateral wall 87. A turning plate 88 has an ear 89 extending into the thin rear section, and the front end has a hole encircling the axle, so that plate 88 positively determines the vane orientation. Connecting link 57 is pivotally attached to the turning plates of the forward vanes 25, and link 58 to the rearward vanes 25'.

The turning plate 88' for the middle vane is enlarged and spur gear 91 is pivotally mounted thereon. Gear 91 meshes with gear 59 which is fixedly attached to a metal channel member 92 which in turn is attached to the under side of the vehicle top 31 (FIG. 4). A circular plate 93 is affixed to the top of gear 91 and coupling link 61 is pivotally attached at 94 near the periphery thereof. Plate 93 overlaps the meshing teeth of the gears to insure that they will stay in mesh.

Vane control rod 55 is pivoted to turning plate 88' at 95 and directly controls the forward vanes 25. As plate 88' turns, gear 91 rotates about its axis and the pivot point 94 rotates therewith to produce relative movements of vanes 25' with respect to vanes 25. Both sets of vanes 25, 25' are shown in approximately fore and aft positions for straight ahead travel of the vehicle. As vanes 25 are turned outward on the outside of a turn, vanes 25' turn more slowly during the initial portion of the turning range and then more rapidly until the vanes of both sets are at approximately the same angle. The same is true as the vanes are turned inward on the inside of a turn. This is illustrated in FIGS. 11 and 11a.

FIG. 11 shows five positions 1-5 of the center vane 25 of FIG. 10, and corresponding positions of the adjacent rearward vane 25'. positions 3, shown in full lines, are the initial fore and aft positions for straight ahead travel, and are designated 0° in the table of FIG. 11a for reference purposes. Line 96 designates the offset of the pivot point 97 of connecting link 61 with respect to the center line of vane 25'. In position 2 the forward vane 25 has been turned outward 40° CCW (counterclockwise) for a medium left turn. The rotation of gear 91 to position 2 and the accompanying movement of pivot point 94, causes the rear vane 25' to turn through a smaller angle, 23° CCW in this instance. Position 1 is for a hard left turn, and vane 25 has been turned outward 80° CCW from its fore and aft position. Vane 25' is turned 83° in this case.

In position 4 the vane 25 is turned inward at 25° CW (clockwise) corresponding to the inside of a medium right turn, and is accompanied by a smaller turning angle of 8° CW for vane 25'. Position 5 is for a hard right turn wherein vanes 25, 25' are turned inward 50° CW. The smaller turning angles of vanes 25' on the inside of a turn in the initial portion of the steering range are not considered necessary, since reducing air flow to the rear steering vanes on the inside of a turn promotes effective steering without undue skidding. However, they are present in the mechanism as specifically illustrated.

It may be mentioned that the difference of 3° in the turning angles of the vanes at the CCW extreme of the turning range may not exist in practice due to play in the linkage, and vanes 25 and 25' may be practically parallel.

Returning to FIG. 10, turning plate 88'' for one of vanes 25' is enlarged and connecting rod 64 pivoted thereto. As seen in FIG. 5, rod 64 controls one transverse set of vanes 27'. Accordingly they turn slowly at small turning angles and then move rapidly at large turning angles. Vanes 27' are normally oriented at about 45° from the center line of the vehicle for straight ahead travel. The coupling through rod 64 is such that vanes 27' turn outward (away from the vehicle center line) as vanes 25' turn inwards, and vice versa.

The control of the left side diagonal vanes 26, 26' and the right side transverse vanes 27 is the same as above described, except that they move in opposite directions during normal steering.

Preferably the pivot points at which connecting links 57 and 58 are attached to the vane turning plates are sufficiently offset from the center lines of the vanes so that they remain outside a line connecting the axes of the vanes at all turning angles. This enables positive control of the vane angles throughout the turning range. If the link pivot points and vane axes become aligned, a condition of instability may result in which unbalance in air flow forces on the vanes may cause one vane to turn outward and another inward without proper restraint by the connecting link.

Summarizing the overall steering control, for straight ahead travel the diagonally-disposed vanes 25, 25', 26, 26' and rear vanes 32, 33 are approximately fore and aft. Outward angles of a few degrees, say 6°, may increase stability in straight ahead travel. Transverse vanes 27, 27' are at approximately 45° outward, as illustrated in FIG. 5, and deflect air around the superstructure 19 so as to increase the direct thrust.

Assuming a right turn, as the handlebar 36 is turned, the forward group of vanes 26 in the diagonally-disposed set on the left side of the vehicle (outside of the turn) are turned outward to direct more and more air laterally of the vehicle at the forward end thereof. The forward group of vanes 25 on the inside of the turn are simultaneously turned inward to progressively cut off air flow thereby. The rearward group 26' of the diagonally-disposed set are also turned outward, but initially at much smaller angles so as to continue to channel a substantial amount of air flow to the rear steering vanes 32 on the outside of the turn during the initial portion of the steering range. Vanes 25' are turned inward, along with vanes 25, to progressively cut off flow of air to the rear steering vanes 33 on the inside of the turn. The closing of vanes 25, 25' on the inside of the turn also increases the flow of air to vanes 26, 26' on the outside of the turn, thereby promoting strong steering forces.

The rear steering vanes 32, 33 are turned in the opposite direction to the forward steering vanes. With the size and number of vanes here employed, and with fixed vertical fin sections 35', it is found desirable to turn the vanes fairly rapidly through their effective steering range of about 45°. This is accomplished by pivoting control rod 67' to rear steering plate 66 (FIG. 6) at a greater distance from the axis 54 than the pivot point of rod 53. Midway of the turning range, the rear steering vanes become ineffective since little air flows thereto, and further turning is unnecessary. Suitable stops may be provided to limit the turning angle. Beyond this limit the control cable 67' will continue to move, but its flexibility allows it to bend. For a left turn, control rod 53 is sufficiently flexible to bend and accommodate the additional movement.

Through the turning range the left set of transversely-disposed vanes 27' turn outward, as vanes 25' turn inward. For small turning angles there is little change, so that air flow is directed toward the rearward group of diagonal vanes 26' to assist in maintaining air flow to the rear set of vanes 32 on the outside of the turn. However, vanes 27 are turned more rapidly inward (CW) as vanes 26' turn outward, and toward the left of the vehicle at larger turning angles. Thus vanes 27 assist in cutting off rearward air flow on the inside of the turn, and aid front steering vaanes 26, 26' in directing air flow to the outside of the turn.

In the thrust-spoiled condition, both sets of diagonally-disposed vanes will be closed in the straight ahead position of the handlebar. Steering in this condition is similar to that described above, except that air flow on the inside of a turn may be maintained cut off for both small and large steering angles, thereby reducing forward thrust.

The effect of the various sets of vanes will depend on the detailed vehicle design, and the relative rates at which they turn over the steering range may be selected to yield the desired control for the detailed design employed. In the mechanism shown, control pivot points and gear ratio may be changed to produce different relative movements, Or, other control mechanisms may be designed to yield the desired control movements.

FIG. 12 shows approximate vane orientations and air flow for several operating conditions. FIG. 12a is the straight ahead condition, with the diagonally-disposed vanes and rear steering vanes approximately fore and aft, with a slight outward angle to promote stability. Pairs of vanes 27, 27' are each directed outwardly. FIG. 12b is for a moderate right turn, with substantial flow of air to the rear steering vanes on the outside of the turn, and less flow to those on the inside of the turn. FIG. 12c is for a hard right turn where substantially all of the air flow is directed laterally of the vehicle on the outside of the turn, air flow on the inside of the turn and to the rear steering vanes being substantially cut off.

Figure 12A:
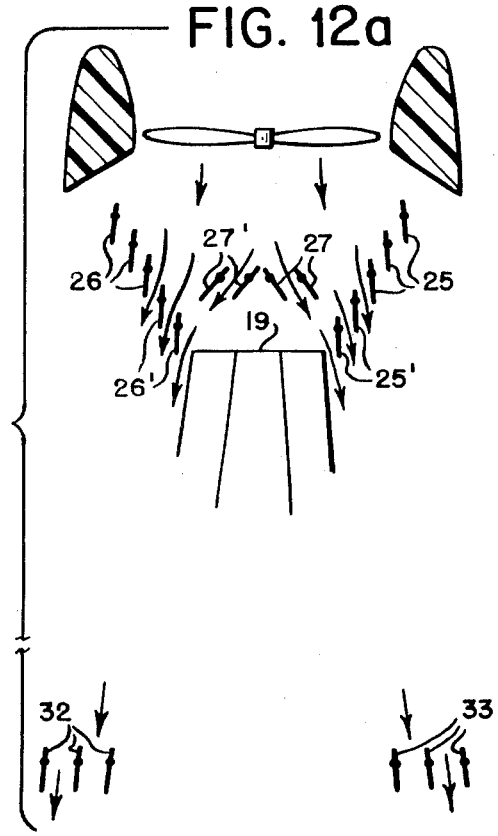
FIGS. 12a–12d are schematics illustrating vane positions and air flow for forward, moderate right turn, hard right turn and thrust spoiled conditions in the embodiment of FIGS. 1–11.
Figure 12B:
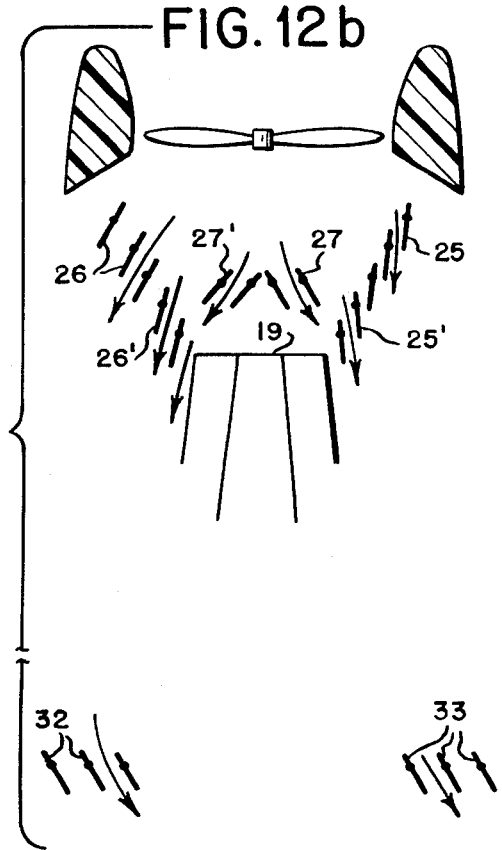
Figure 12C:
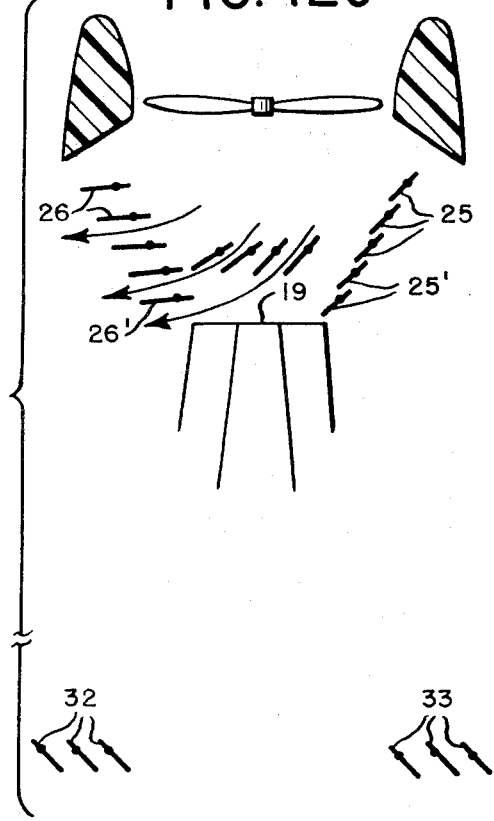
Figure 12D:
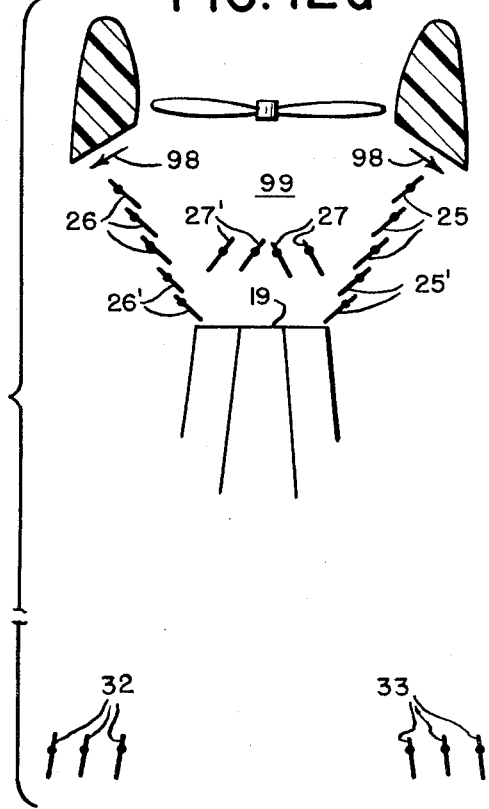
Figure 13A:
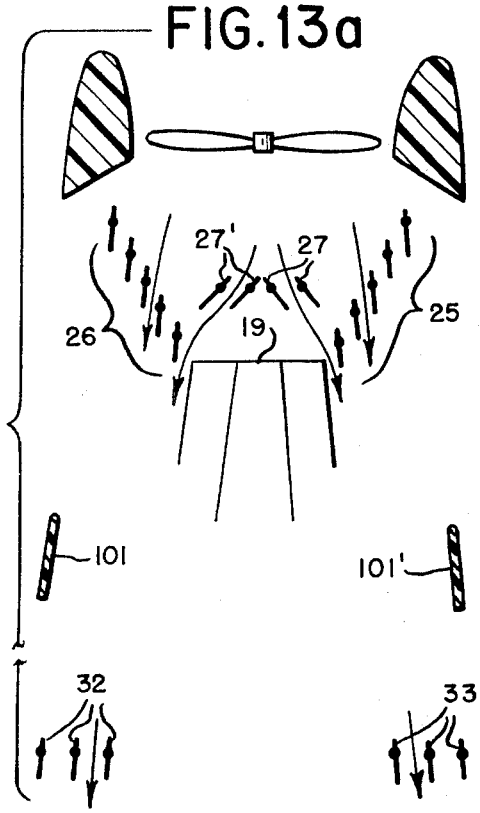
FIGS. 13a–13d are similar schematics of a modification using fixed air channels.
Figure 13B:
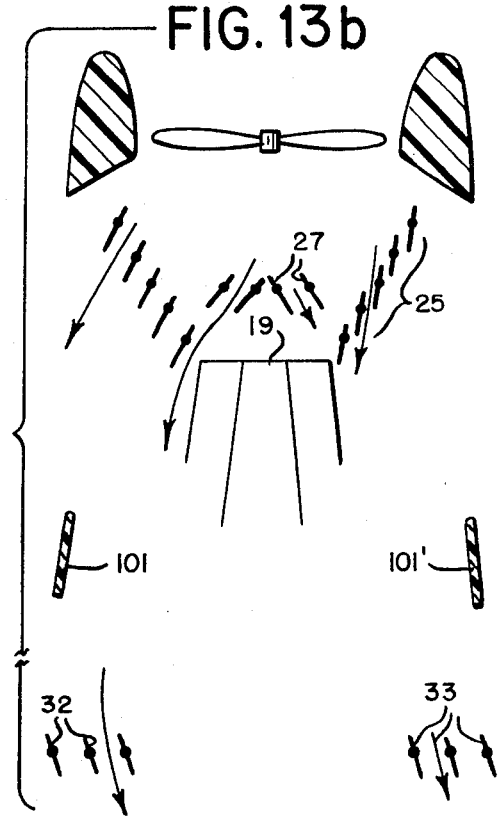
Figure 13C:
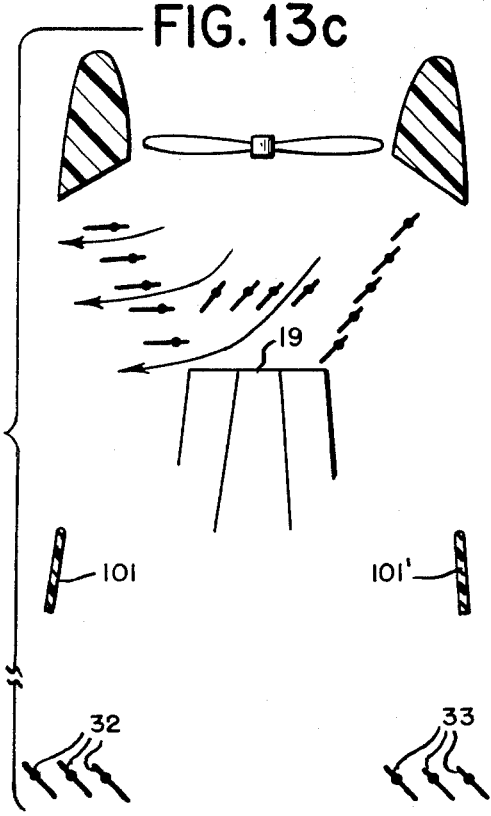
Figure 13D:
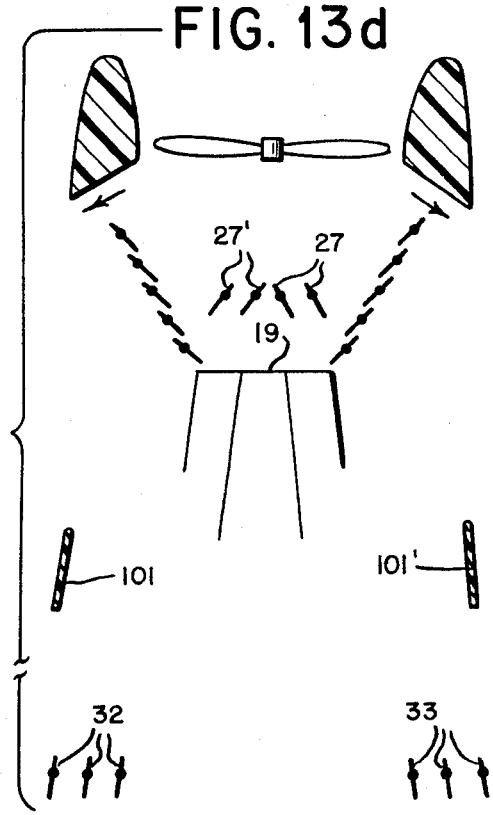
Figure 14A:
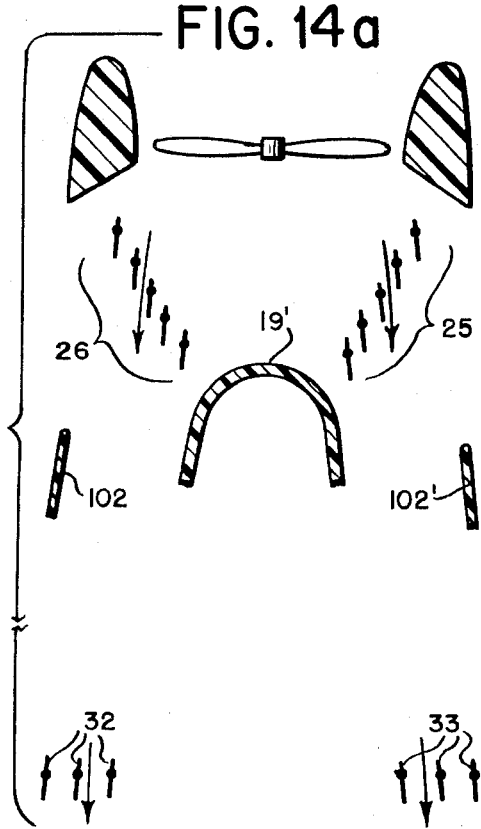
FIGS. 14a–14d are similar schematics of another embodiment using fixed air channels.
Figure 14B:
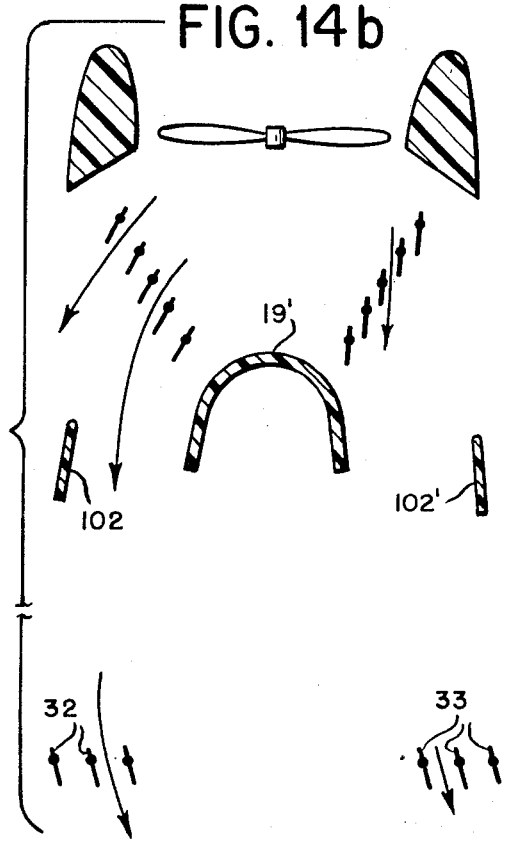
Figure 14C:
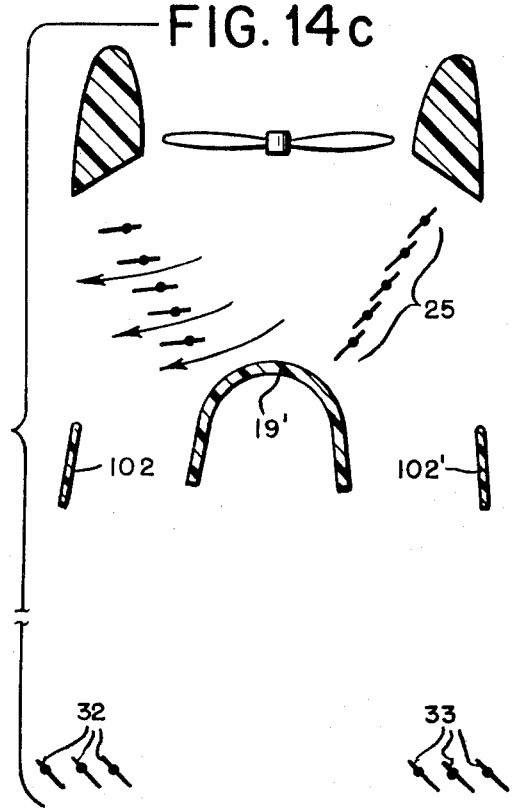
Figure 14D:
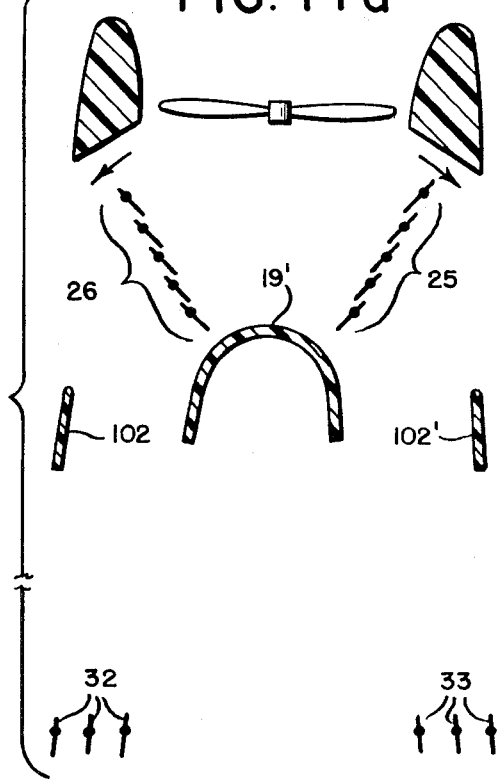

FIG. 12d illustrates the thrust spoiled condition in straight ahead travel. Air flow toward the rear of the vehicle is substantially cut off, so that the propulsion thrust is small. There may be some leakage as indicated by arrows 98. It will be noted that in the fully cut off condition of the diagonally-disposed vanes each vane is turned somewhat inward of the line connecting their pivot axes so that the trailing edge of each vane is inside the leading edge of the following vane. This has been found desirable to obtain effective thrust spoiling. With air foil cross-sections as shown in FIG. 10, the vanes are in a stalled condition for thrust spoiling, with considerable air flow on the inside of the vanes but very little on the outside thereof. If the vanes are aligned for thrust spoiling, air can flow continuously down the inner surfaces of the set of vanes and, due to the pressure in region 99, there would be considerable leakage in the clearance space between vanes. With the trailing edges of the vanes inside the leading edges of the succeeding vanes, air separates from the trailing edge of one vane before it reaches the leading edge of the next. In such case considerable energy is required to cause air to flow out through the clearance space between the vanes, and in practice it is found that little leakage exists.

Referring to FIG. 13, a modification is shown in which all the vanes of each diagonally-disposed set 25 or 26 are turned together. This may be accomplished in the system shown in FIG. 5 by eliminating the mechanism including gear 59, and connecting vanes 25, 25' together by a single connecting link and similarly for vanes 26, 26'. Since the rearward vanes of each diagonally-disposed set will turn more rapidly in the initial portion of the steering range than in FIG. 12, air flow to the rear vanes on the outside of a turn will be cut off at smaller turning angles. Consequently fixed air channels including upright sides 101, 101' may be employed as in U.S. Pat. No. 3,608,662 to maintain air flow to the rear vanes on the outside of a turn over the desired portion the steering range. The rearward and lateral positions of sides 101, 101' may be selected with respect to the outward turning angles of vanes 25 and 26 to maintain rear steering over the desired range.

FIGS. 13a–13d illustrate straight ahead steering, moderate right turn, hard right turn and thrust-spoiled conditions similar to FIG. 12.

Referring to FIG. 14, here the diagonally-disposed sets of vanes 25, 26 turn together as in FIG. 13, and the transversely-disposed sets of vanes 27, 27' are eliminated. The front wall 19' of the operator compartment is preferably rounded, as in U.S. Pat. No. 3,608,662, to promote air flow thereby without undue turbulence, since the control effect of the transversely-disposed vanes is no longer present. Fixed air channels with side walls 102, 102' are employed as in FIG. 13, and may be located to maintain air flow to the rear steering vanes on the outside of a turn over the desired portion of the steering range. FIGS. 14a–14d illustrate the same conditions as in FIGS. 12 and 13.

If desired, differential control of the diagonally-disposed sets of vanes could be employed in the fixed air channel arrangement of FIGS. 13 and 14, and the relative turning angles selected to yield the desired overall control.

Figure 15:
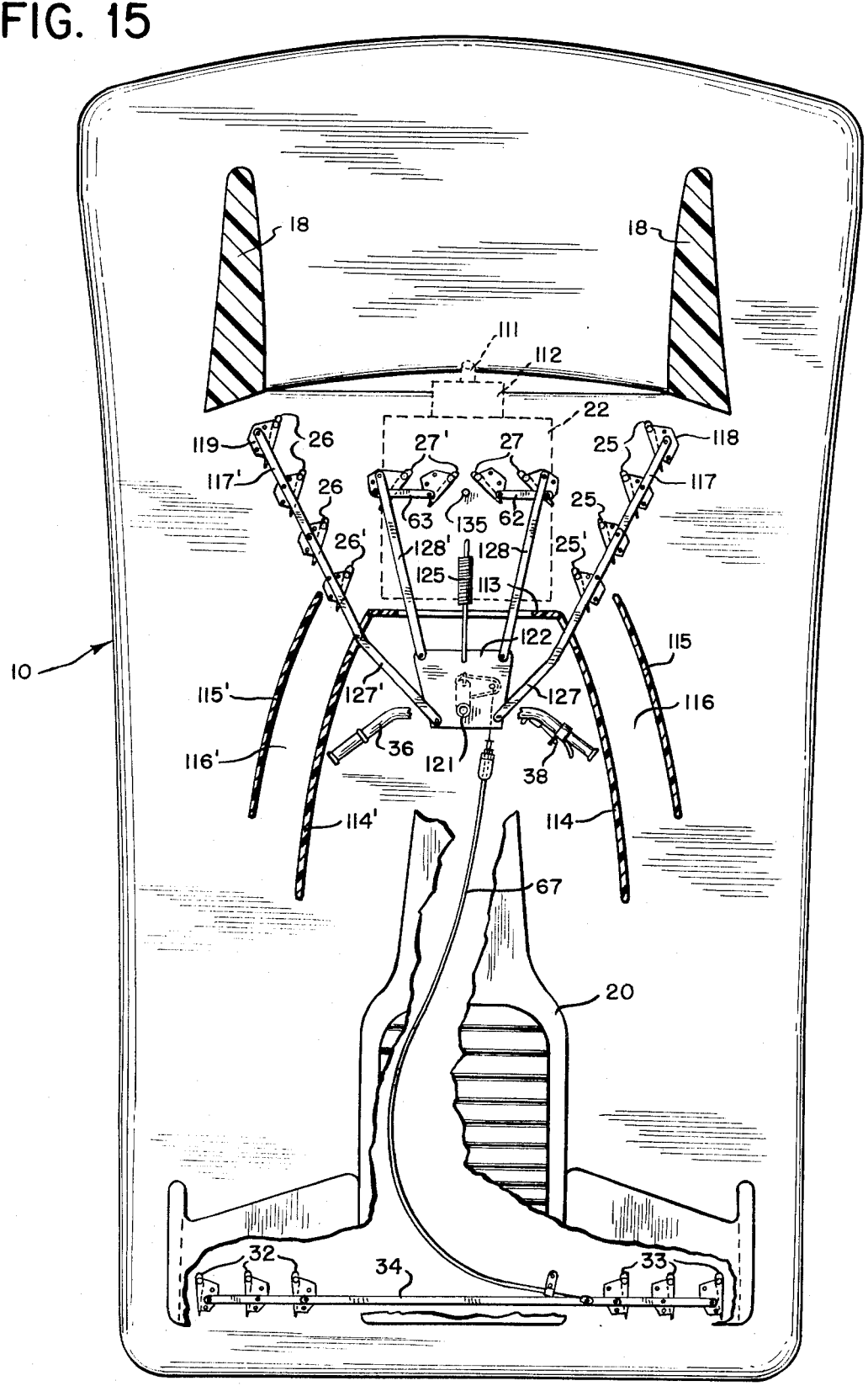
FIG. 15 is a plan view of an embodiment employing air channels and differential vane control, with top sections removed to illustrate the vane control system.

Referring to FIG. 15, one of the presently preferred embodiments is shown which employs air channels and differential control of the diagonally-disposed sets of vanes. The steering mechanism is considerably simplified and the thrust-spoiling feature combined therewith in a simple manner.

The vehicle body 10 is similar to that shown in FIGS. 1–4 although differing in some details which need not be described here. Engine 22 drives shaft 11 through a gear box 112. A propeller (not shown) is attached to shaft 111, and is encircled by shroud 18. The body section behind which the operator sits includes a front wall 113 and side walls 114, 114' similar to that of previous figures, with added upright sides 115, 115' to form fixed air channels 116, 116'. The air channels may be relatively narrow as shown, and curved to direct air to the rear vanes. The top 31 of FIGS. 1 and 2 has been omitted to show the vane structure clearly, but will be understood to extend over the vanes and air channels.

The diagonally-disposed sets of vanes 25, 26 are here four in number, with the vane turning plates of the three forward vanes of each set connected together by links 117, 117' for simultaneous movement. The rearward vane 25', 26' of each set is arranged for differential movement and controls air flow through the respective air channel. The vane turning plates 118, 119 are similar to those described before but have differently shaped tops and several pivot holes which allow the use of similar turning plates for all vanes on one side of the vehicle.

As shown in FIGS. 15 and 18, steering column 121 has a control plate 122 attached near the top of the column, and is turned by handlebar 36 shown partially broken away. The bottom of column 121 is mounted in a grommet 123 in the vehicle body to allow the top of the column to be pulled backward for thrust spoiling. A slotted guide plate 124 mounted on the top of the vehicle (not shown) limits forward and backward movement. Tension spring 125 attached to the vehicle body at 126 biases plate 122 to the forward position shown, which is the normal steering position. Control bars 127, 127' are pivoted to plate 122 and control the diagonally-disposed sets of vanes. Control bars 128, 128' are pivoted to plate 122 and control the center transversely-disposed sets of vanes 27, 27'. Control arm 129 is attached to the bottom of the column and controls the rear steering vanes through the sheathed cable 67. Spring 125 also biases the steering mechanism toward its straight-ahead condition.

FIG. 16 shows control bar 127 and link 117 pivoted to the turning plate 118 of vane 25 in the forward set of diagonally-disposed vanes. Thus rotation of the forward set is directly controlled by rotation of the steering column and plate 122. The rearward vane 25' is differentially controlled. As shown in FIGS. 16 and 17, the orientation of vane 25' is in part determined by a pin 131 affixed to control bar 127 and a tension spring 132 attached to the pin and to the turning plate 118. The spring tends to hold pin 131 in engagement with the adjacent edge of the turning plate. A stop pin 133 is attached to a member 134 fixed to the top of the vehicle, and engages plate 118 to prevent counterclockwise movement from the position shown.

The vanes are shown in their orientations for straight ahead travel. As is apparent from FIG. 15, air from the propeller flows rearward to propel the vehicle, and vane 25' allows air flow through channel 116 to rear vanes 33. The same action occurs on the left side of the vehicle. If bar 127 is pulled back for a right turn, vane 25' will be rotated clockwise, along with vanes 25. Approximately the same clockwise angles may be employed, or somewhat different angles depending on the shape of plate 118 where it abuts pin 131, etc. Thus vanes 25 progressively cut off rearward air flow, and the rotation of vane 25' progressively cuts off air flow through air channel 116 to rear steering vanes 33 on the inside of the turn. If bar 127 is pushed forward for a left turn, vanes 25 will be turned outward to produce a front steering force. However, stop pin 133 will prevent vane 25' from turning from the position shown, thereby maintaining air flow to the rear steering vanes on the outside of a turn. Vanes 26, 26' are controlled similarly, control bar 127' being pulled back for a left turn and pushed forward for a right turn.

The transverse set of vanes 27, 27' are controlled by control bars 128, 128'. For a right turn, wherein vanes 26 are turned outward, vanes 27 are rotated clockwise by the pull on bar 128 so as to direct more air toward vanes 26, 26' on the outside of the turn. Vanes 27' may also be turned somewhat clockwise. The opposite occurs for a left turn. A stop 135 limits turning of the vanes.

For thrust spoiling, the handlebar and top of the steering column are pulled backward. In the straight ahead condition of FIG. 15, both control bars 127, 127' are pulled backward to turn the diagonal sets of vanes inward. The transverse sets of vanes 27, 27' are also turned inward. This greatly reduces or substantially cuts off rearward flow of air above the vehicle body. Since the chamber behind the propeller is now effectively closed off, except for some leakage, the air pressure in the plenum chamber below the vehicle may increase and rearward air flow from the air cushion beneath the vehicle may increase. Thus some forward propulsion force still exists, but it is markedly reduced from the full thrust available under normal travel conditions. Further, the increased air cushion appears to facilitate low speed travel.

To steer in the thrust spoiled condition, the operator turns the handlebar in normal manner. However, inasmuch as the forward sets of vanes on the inside of a turn have already been turned as far as possible, turning the handlebar causes the steering column to move forward, the operator allowing this forward movement while holding back sufficiently to keep the vanes on the inside of the turn in their thrust spoiled condition. This continues to cut off air flow on the inside of the turn while allowing air flow on the outside of the turn to produce the desired turning. For a hard turn requiring maximum turning of the handlebar, the steering column will move to its full forward position to allow full thrust on the outside of the turn while maintaining full thrust spoiling on the inside of the turn.

Figure 19A:
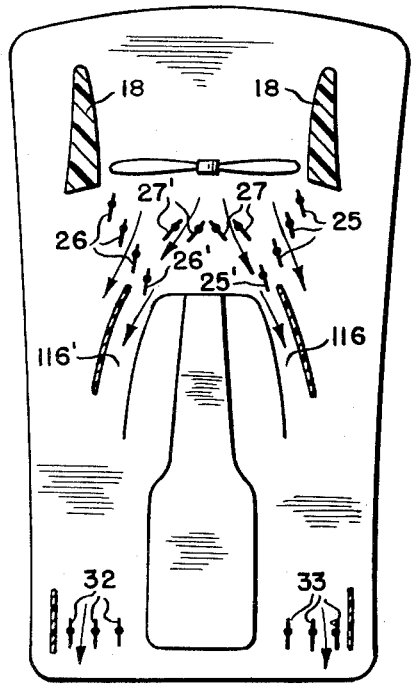
FIGS. 19a–19d are schematics illustrating vane positions and air flow for FIG. 15.
Figure 19B:
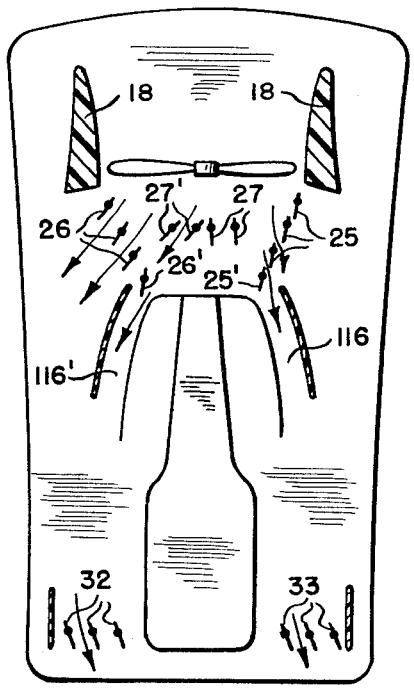

FIG. 19a illustrates vane positions for forward direction of travel, and is similar to FIG. 12a except that air channels 116, 116' assist in directing air to the rear vanes. FIG. 19b is for a moderate right turn, with vanes 26 turned moderately outward and vanes 25 moderately inward. Vanes 27 are partially turned to direct some air away from vanes 25, 25' on the inside of the turn and toward vanes 26, 26' on the outside of the turn. Vane 26' continues to allow full air flow through channel 116' to rear vanes 32, whereas vane 25' partially cuts off air flow through channel 116 to rear vanes 33. Rear vanes 32, 33 are turned moderately counterclockwise to produce rear steering, vanes 32 being more effective since more air flows thereto.

Figure 19C:
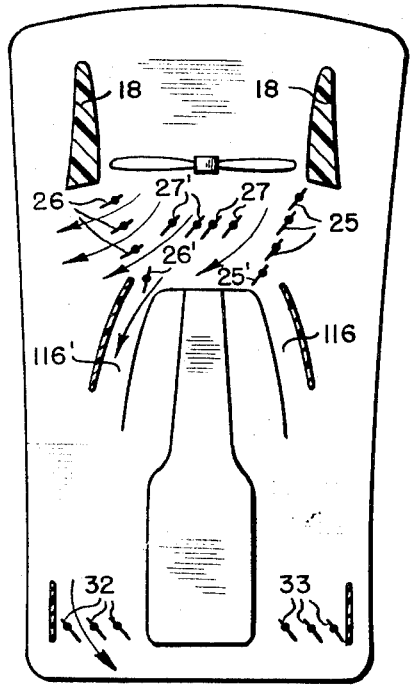

FIG. 19c is for a hard right turn. Vanes 26 are turned farther outward, and vanes 25, 25' are turned fully inward to substantially cut off air flow on the inside of the turn. Vanes 27 are turned toward the outside of the turn. Vane 26' maintains its original orientation to produce full air flow to rear vanes 32, whereas vane 25' substantially cuts off air flow to rear vanes 33.

Figure 19D:
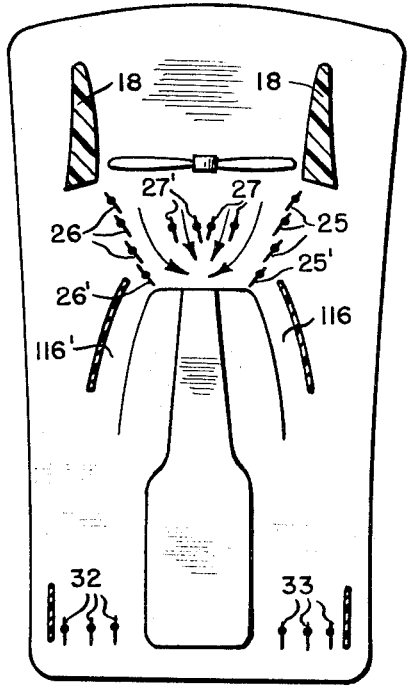

FIG. 19d shows the full thrust-spoiled condition. Vanes 25, 25', 26, 26' are all turned inward to cut off air flow thereby, and vanes 27, 27' are turned slightly inward.

In one specific embodiment the diagonal sets of vanes where oriented approximately 15° outward for straight-ahead travel so as to direct the air flow around the body structure, and the rear vanes about 6° outward to promote stability. For steering, wherein the handlebar could be turned 30° in either direction, the vanes are turned through the following angles from their orientations for straight-ahead travel: The forward vanes of a diagonal set (e.g., 26) turned outward through about 50° on the outside of a turn and inward through about 40° on the inside of a turn. Rearward vanes of the diagonal sets (e.g. 26') remained unchanged on the outside of a turn and turned inward about 40° on the inside of a turn. Transverse vanes (e.g. 27') on the outside of a turn turned about 10° outward and those on the inside of a turn about 90° toward the outside of the turn. The rear steering vanes turned through about 45°. The vane turning angles were approximately linearly related to the handlebar angle, with some deviations due to the particular linkage employed. For thrust spoiling, the diagonally disposed vanes were turned inward about 40°, and the transverse vanes inward about 50°.

These angular relationships are given for example only, and may be changed as meets the requirements of a particular design.

It is possible to eliminate the air channels of FIGS. 15 and 19, and relay upon the differential control of vanes 25' and 26' as described above to control air flow to the rear steering vanes, provided that the body design allows adequate flow of air to the rear vanes. However, the use of the air channels is presently preferred, aand allows greater freedom of body design.

FIGS. 20 and 21 show another presently preferred embodiment of the invention. The embodiment of FIGS. 15–19 is capable of good performance. However, in one specific construction it was found that the rear steering at high speed was more sensitive than desired. This could be corrected by employing a variable ratio coupling between front and rear steering vanes, as described in U.S. Pat. No. 3,608,662.

FIGS. 20 and 21 illustrate a different solution to the problem which, in addition, simplifies the steering mechanism and decreases thrust losses in straight ahead travel. Here the diagonally-disposed sets of vanes 25, 26 are turned together, and the outer walls 141, 141' of the air channels are designed and positioned so that a differential control of the air directed to the rear steering vanes on the outside of a turn is obtained.

Figure 20A:
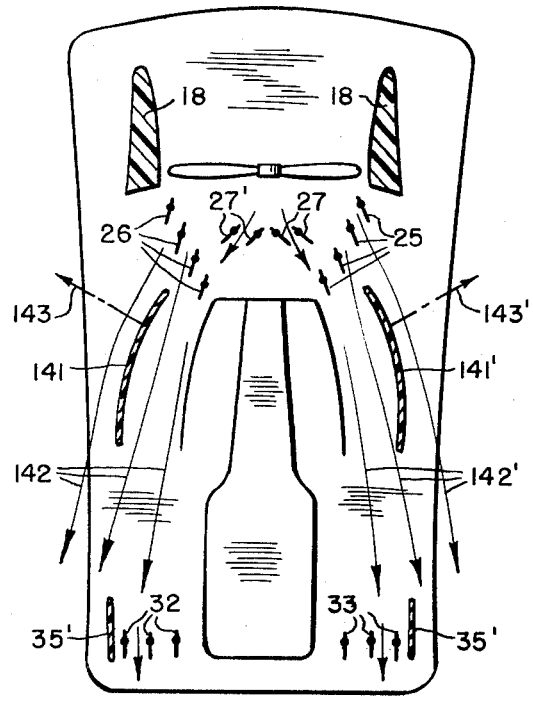
FIGS. 20a–20d illustrate air channels and vane control for differential control of air flow to the rear steering vanes.

Thus, in the straight-ahead condition shown in FIG. 20a, with the vanes oriented as in FIG. 19a, a smaller portion of the downstream flow of aair is directed to the rear vanes 32, 33. As a result, less air strikes the structure surrounding and supporting the rear vanes (e.g., 35, 35' in FIGS. 1 and 2) and there is less drag. The flow of air is illustrated by arrows 142, 142', and it will be observed that a large portion of the air passes outside the rear vanes and supporting structure.

Due to their outward curvature, walls 141, 141' function similarly to a wing of an aircraft but oriented vertically, and provide thrust vectors extending laterally and forwardly as indicated by dotted arrows 143, 143'. The forward components help counteract the loss of inserting the walls in the air stream.

Figure 20B:
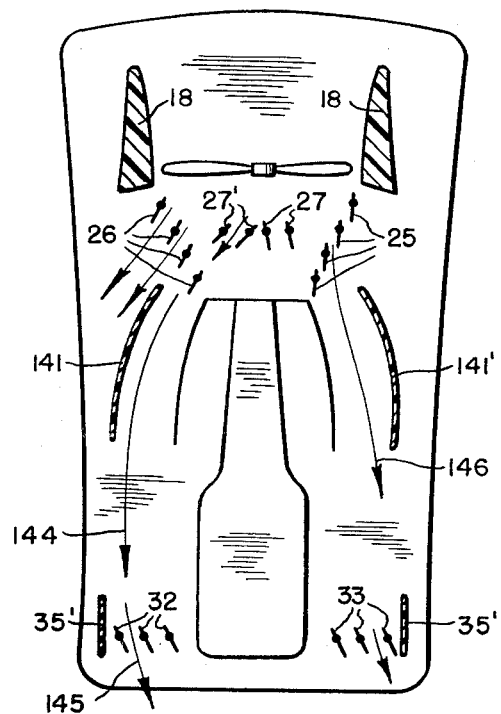

As vanes 26 turn outward for a right turn, the forward vanes direct air flow laterally to produce a front steering force whereas the rearward vanes direct air flow to the concave inner surface of wall 141, as illustrated in FIG. 20b for a moderate right turn. Wall 141 is shaped and positioned to direct this air flow to the rear vanes 32 as indicated by arrow 144, thereby focussing or concentrating more air at the rear vanes, and the turning of the rear vanes produces a rear steering force as indicated by arrow 145. The inward turning of vanes 25 on the inside of the turn reduces the flow of air to rear vanes 33, indicated by arrow 146.

Figure 20C:
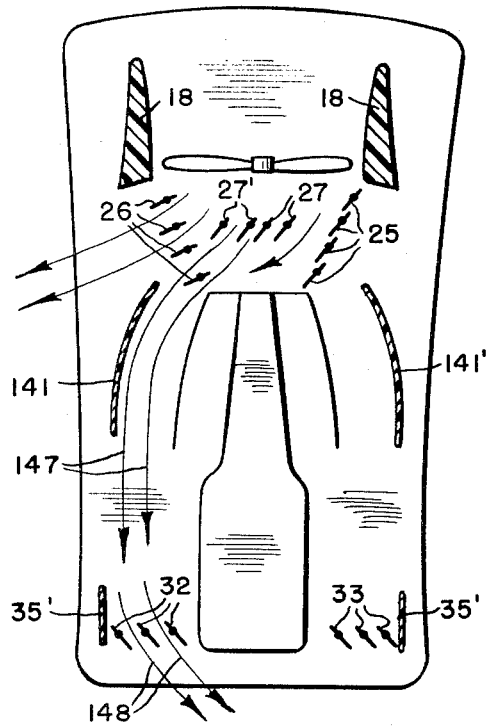

For a hard right turn as illustrated in FIG. 20c, the forward vanes to set 26 increase the lateral thrust for front steering, whereas the rearward vanes of the set continue to direct air against the inside of wall 141 to the rear steering vanes, as indicated by arrows 147. The turning of vanes 27 toward the outside of the turn assists in this action. Thus strong rear steering forces are produced by vanes 32 as indicated by arrows 148. The inward turning of vanes 25 substantially cuts off air flow to the rear vanes 33 on the inside of the turn.

Accordingly, for small steering angles the smaller amount of air to the rear steering vanes reduces the rear steering sensitivity and decreases thrust losses. As the steering angle increases, more air is directed to the rear vanes on the outside of a turn with resultant increase in rear steering effectiveness. Thrust losses may increase somewhat as the steering angle increases, but this is of little importance as compared to the smaller thrust losses for straight ahead travel.

Figure 20D:
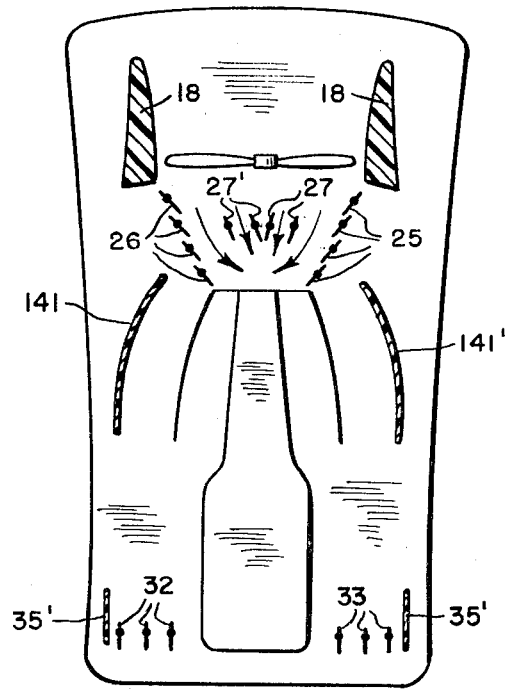

FIG. 20d shows the thrust spoiled condition, and is similar to FIG. 19d.

To control the diagonally-disposed sets of vanes 25, 26 in accordance with FIGS. 20a–d, the control mechanism of FIG. 15 may be modified as shown in FIG. 21. Here link 117 is pivoted to all four vanes 25 so that they turn together. Control bar 127 is pivoted at 149 to the link 117 and the rearmost vane. Vanes 26 on the other side are similarly controlled. The differential vane control mechanism of FIGS. 16 and 17 is omitted, but the steering and thrust-spoiling arrangement of FIG. 18 may be the same. Accordingly the overall steering mechanism is simplified.

In the embodiments shown, thrust spoiling is accomplished by turning the diagonally-disposed vanes inward to substantially cut off air flow from the compartment behind the propeller. This provides a smooth transition from air flow to cut off conditions. For a hard turn, the vanes on the inside of the turn are similarly turned to their cut off positions. To steer in a thrust-spoiled condition, the set of vanes on the inside of the turn may remain unchanged and the set on the outside of the turn turned outward from smaller to larger turning angles. Thus the steering action is similar in both normal and thrust spoiled conditions.

With a suitable change in the control mechanism, it is possible to eliminate the rearward thrust by turning both sets of diagonally-disposed vanes outward at substantially right angles to the vehicle center line. Since the vanes will be in a stalled condition rather than in an air guiding condition, lateral air flow will be small, although greater than in the embodiments shown. To steer in this thrust-spoiled condition, the vanes on the outside of the turn may be progressively turned inward, while leaving the vanes on the inside of the turn unchanged. This involves a reversal of the normal steering operation, thus complicating the steering mechanism. Also, the turning force passes through a maximum and then decreases so that the steering action is different in normal and thrust-spoiled conditions and may be disconcerting to the operator. Thus the arrangements shown are preferred.

In the specific embodiments several combinations of vane turning angles have been described, with and without fixed air channels. It will be understood that features of one combination may be combined with those of another, or certain features eliminated, as meets the requirements of a particular design or the judgment of the designer, and appropriate changes made in the vane turning mechanism.

I claim:
1. An air cushion vehicle which comprises
  a. a body,
  b. means for propelling and supporting said body on an air cushion including air propelling means mounted toward the forward end of the body and adapted to produce a flow of air in the rearward direction of the vehicle,
  c. front steering means comprising respective upwardly-extending forward sets of vanes rotatably mounted on opposite sides of the vehicle and spaced progressively rearwardly and inwardly in the air flow from said propelling means,
  d. rear steering means mounted toward the rear of the vehicle on each side thereof,
  e. means for orienting said forward sets of vanes approximately fore and aft for forward propulsion with at least a portion of the air from said propelling means directed to said rear steering means on each side of the vehicle,
  f. and steering control means for turning predetermined vanes of either of said forward sets of vanes outward to direct a portion of the air from said propelling means to the ambient air at lateral angles on either side of the vehicle.

2. A vehicle in accordance with claim 1 including means for turning both said forward sets of vanes to orientations substantially reducing flow of air thereby in the rearward direction of the vehicle.

3. A vehicle in accordance with claim 1 in which said steering control means for turning predetermined vanes of either of said forward sets of vanes outward includes means for turning predetermined vanes of the other forward set of vanes inward to reduce air flow therethrough.

4. A vehicle in accordance with claim 3 including means for directing air from said front steering means to the rear steering means on the outside of a turn for at least smaller turning angles within the steering range.

5. A vehicle in accordance with claim 3 including means for turning both said forward sets of vanes inward to substantially reduce air flow therethrough toward the rear of the vehicle.

6. A vehicle in accordance with claim 3 including a pair of laterally spaced air channels positioned between rearward vanes of said forward sets of vanes and the rear steering means on respective sides of the vehicle, said steering control means turning said rearward vanes outward on the outside of a turn and inward on the inside of a turn, said channels and the turning of the rearward vanes being designed and adapted to change the air flow to said rear steering means on the outside of a turn from smaller or larger amounts as the turning angle increases and to reduce air flow to the rear steering means on the inside of a turn.

7. A vehicle in accordance with claim 3 including means for maintaining the orientation of at least one rearward vane of the forward set of vanes on the outside of a turn to direct air to the rear steering means on the outside of a turn for at least a major portion of the steering range.

8. A vehicle in accordance with claim 7 including means for turning the corresponding rearward vane of the forward set of vanes on the inside of a turn to reduce the rearward flow of air thereby for at least larger turning angles within the steering range.

9. A vehicle in accordance with claim 8 including a pair of laterally spaced air channels positioned respectively between said at least one rearward vane of each forward set of vanes and the rear steering means on the respective side of the vehicle for directing air flow therethrough to the rear steering means under the control of said rearward vanes.

10. An air cushion vehicle which comprises
  a. a body,
  b. means for propelling and supporting said body on an air cushion including air propelling means mounted toward the forward end of the body and adapted to produce a flow of air in the rearward direction of the vehicle,
  c. front steering means comprising respective forward sets of upwardly-extending vanes rotatably mounted on opposite sides of the vehicle and spaced progressively rearwardly and inwardly in the air flow from said propelling means,
  d. rear steering means mounted toward the rear of the vehicle on each side thereof,
  e. means for orienting said forward sets of vanes approximately fore and aft for forward propulsion with at least a portion of the air from said propelling means directed to said rear steering means on each side of the vehicle,
  f. and steering control means for turning predetermined vanes of either of said forward sets of vanes relative to the other set to change the proportion of rearward flow of air thereby.

11. A vehicle in accordance with claim 10 in which one of said forward sets of vanes is turned inward to reduce the rearward flow of air thereby.

12. An air cushion vehicle which comprises
  a. a body,
  b. means for propelling and supporting said body on an air cushion including air propelling means mounted toward the forward end of the body and adapted to produce a flow of air in the rearward direction of the vehicle,
  c. a body section behind said air propelling means and spaced therefrom with lateral openings to the ambient air on each side of the vehicle,
  d. respective forward sets of upwardly-extending steering vanes mounted in said lateral openings and spaced progressively rearwardly and inwardly of the vehicle,
  e. upwardly-extending rear steering vanes mounted near the rear of the vehicle on each side thereof,
  f. steering control means for orienting said forward sets of vanes approximately fore and aft for forward direction of travel and for turning predetermined vanes of either set outward to direct a portion of the air from said air propelling means to the ambient air on the respective side of the vehicle and predetermined vanes of the other set inward to reduce air flow therethrough, g. at least a portion of the air flow from said propelling means with said forward sets of vanes in their orientation for forward travel being directed to said rear steering vanes on respective sides of the vehicle, and means for maintaining air flow from said propelling means to the rear steering vanes on the outside of a turn during at least small angles within the steering range.

13. An air cushion vehicle in accordance with claim 12 in which said means for maintaining air flow to the rear steering vanes includes air channeling means on respective sides of the vehicle between said forward and rear steering vanes.

14. An air cushion vehicle in accordance with claim 13 in which said air channeling means includes a pair of laterally spaced air channels positioned for control of air flow therethrough by at least one rearward vane of each of said forward sets of vanes respectively, and said steering control means includes means for controlling the orientation of the said rearward vanes of the forward sets to maintain air flow through the air channel on the outside of a turn for at least a major portion of the steering range and reduce air flow through the air channel on the inside of a turn for at least larger turning angles within the steering range.

15. An air cushion vehicle in accordance with claim 14 in which said air channels and the turning of said rearward vanes are designed and adapted to change the air flow to the rear steering vanes on the outside of a turn from smaller to larger amounts as the turning angle increases.

16. An air cushion vehicle in accordance with claim 12 including thrust spoiling means for turning both said forward sets of vanes inward to substantially reduce air flow therethrough toward the rear of the vehicle.

17. An air cushion vehicle in accordance with claim 12 including a transverse set of upwardly-extending vanes mounted in front of said body section between said forward sets of vanes and spaced transversely of the vehicle, said steering control means including means for orienting predetermined vanes of said transverse set on opposite sides of the vehicle outwardly and rearwardly for forward direction of travel and for turning the vanes on the inside of a turn toward the lateral opening on the outside of the turn during at least large angles within the steering range.

18. An air cushion vehicle in accordance with claim 17 including thrust spoiling means for turning both said forward sets of vanes inward to substantially reduce arir flow therethrough and for turning the vanes of said transverse set inwardly from their orientations for forward direction of travel.

19. An air cushion vehicle in accordance with claim 12 in which said means for maintaining air flow to the rear steering vanes on the outside of a turn includes means for turning predetermined forward vanes of said forward sets of vanes outward at greater angles than at least one rearward vane thereof during at least the smaller angle portion of the steering range.

20. An air cushion vehicle in accordance with claim 19 including separate links connecting predetermined forward vanes and at least one rearward vane of each forward set of steering vanes, and means for producing relative movement between the links of each set to produce larger turning angles of the forward vanes than the turning angles of at least one rearward vane on the outside of a turn during at least the smaller angle portion of the steering range.

21. An air cushion vehicle in accordance with claim 20 including thrust spoiling means for turning both said forward sets of vanes inward to substantially reduce air flow therethrough toward the rear of the vehicle.

22. An air cushion vehicle which comprises a. a body, b. means for propelling and supporting said body on an air cushion including an air propeller mounted toward the forward end of said body and adapted to produce a flow of air in the rearward direction of the vehicle, c. a body section behind said air propeller and spaced therefrom with lateral openings to the ambient air on each side of the vehicle, d. respective forward sets of upwardly-extending steering vanes mounted in said lateral openings and spaced progressively rearwardly and inwardly of the vehicle, e. upwardly-extending rear steering vanes mounted near the rear of the vehicle on each side thereof, f. steering control means for orienting said forward sets of vanes approximately fore and aft for forward direction of travel and for turning predetermined forward vanes of either set outward to direct a portion of the air from said propeller to the ambient air at lateral angles on the respective side of the vehicle and predetermined forward vanes of the other set inward to reduce air flow therethrough, g. a pair of laterally spaced air channels positioned respectively between at least one rearward vane of each forward set of vanes and the rear steering vanes on the respective side of the vehicle for directing air flow to the rear steering vanes under the control of said rearward vanes, h. said steering control means including means for controlling the orientation of said rearward vanes to maintain air flow through the air channel on the outside of a turn for at least a major portion of the steering range and reduce air flow through the air channel on the inside of a turn for at least larger turning angles within the steering range, and i. said steering control means including means for turning both said forward sets of steering vanes inward to substantially reduce air flow therethrough toward the rear of the vehicle.

23. An air cushion vehicle in accordance with claim 22 in which said air channels and the turning of said rearward vanes are designed and adapted to change the air flow to the rear steering vanes on the outside of a turn from smaller to larger amounts as the turning angle increases.

24. An air cushion vehicle according to claim 22 in which said steering control means maintains the orientation of at least one rearward vane of the forward set of vanes on the outside of a turn substantially unchanged for at least a major portion of the steering range.

25. An air cushion vehicle in accordance with claim 22 including a transverse set of upwardly-extending vanes mounted in front of said body section between said forward sets of vanes and spaced transversely of the vehicle, said steering control means including means for orienting predetermined vanes of said transverse set on opposite sides of the vehicle outwardly and rearwardly for forward direction of travel and for turning the vanes on the inside of a turn to direct air flow toward the forward set of vanes on the outside of a turn over at least the larger angle portion of the steering range.

26. An air cushion vehicle in accordance with claim 22 in which said steering control means includes a pair of links connecting predetermined forward vanes of said forward sets of vanes respectively, a turnable steering column having a control member attached thereto, control bars pivotally attached to said control member on opposite sides of the turning axis thereof and connected to said pair of links respectively, stop means positioned to prevent substantial turning of at least one rearward vane of each of said forward sets of vanes outward from their normal orientation for forward travel, and resiliently biased coupling means connecting said control bars with said rearward vanes respectively for turning the vanes inward.

27. An air cushion vehicle in accordance with claim 22 in which said steering control means includes a pair of links connecting predetermined forward vanes of said forward sets of vanes respectively, a turnable steering column having a control member attached thereto toward the top thereof and mounted for movement of the top of the column to forward and rearward positions, control bars pivotally attached to said control member on opposite sides of the turning axis thereof and connected to said pair of links respectively, said column in one position thereof allowing normal steering and in the other position turning said forward sets of vanes inward in the straight ahead orientation of the column to substantially reduce air flow toward the rear of the vehicle.

* * * * *